US009002704B2

(12) United States Patent
Kamano

(10) Patent No.: US 9,002,704 B2
(45) Date of Patent: Apr. 7, 2015

(54) SPEAKER STATE DETECTING APPARATUS AND SPEAKER STATE DETECTING METHOD

(75) Inventor: Akira Kamano, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 515 days.

(21) Appl. No.: 13/365,662

(22) Filed: Feb. 3, 2012

(65) Prior Publication Data

US 2012/0253807 A1 Oct. 4, 2012

(30) Foreign Application Priority Data

Mar. 31, 2011 (JP) .................................. 2011-079902

(51) Int. Cl.
*G10L 15/00* (2013.01)
*G10L 17/00* (2013.01)
*G10L 25/63* (2013.01)
*G10L 17/26* (2013.01)

(52) U.S. Cl.
CPC .................. *G10L 25/63* (2013.01); *G10L 17/26* (2013.01); *G10L 17/005* (2013.01)

(58) Field of Classification Search
USPC ........................................................ 704/240
See application file for complete search history.

(56) References Cited

U.S. PATENT DOCUMENTS

| 7,340,393 | B2 | 3/2008 | Mitsuyoshi | |
|---|---|---|---|---|
| 2003/0182123 | A1* | 9/2003 | Mitsuyoshi | ................... 704/270 |
| 2006/0028556 | A1* | 2/2006 | Bunn et al. | ............... 348/211.99 |
| 2006/0122834 | A1* | 6/2006 | Bennett | ......................... 704/256 |
| 2007/0088833 | A1* | 4/2007 | Yang et al. | ..................... 709/227 |
| 2007/0263978 | A1* | 11/2007 | Yang et al. | ........................ 386/52 |
| 2009/0043586 | A1* | 2/2009 | MacAuslan | ................... 704/270 |
| 2009/0313019 | A1* | 12/2009 | Kato et al. | ..................... 704/254 |
| 2011/0131042 | A1* | 6/2011 | Nagatomo | .................... 704/240 |

FOREIGN PATENT DOCUMENTS

| JP | 2002-091482 | 3/2002 |
|---|---|---|
| JP | 2004-259238 | 9/2004 |
| JP | 2006-130121 | 5/2006 |
| JP | 2010-175684 | 8/2010 |

OTHER PUBLICATIONS

Bear, Mark F. et al., "Neuroscience: Exploring the Brain", Jun. 1, 2007, pp. 437-452.

(Continued)

*Primary Examiner* — David Hudspeth
*Assistant Examiner* — Timothy Nguyen
(74) *Attorney, Agent, or Firm* — Fujitsu Patent Center

(57) ABSTRACT

A speaker state detecting apparatus comprises: an audio input unit for acquiring, at least, a first voice emanated by a first speaker and a second voice emanated by a second speaker; a speech interval detecting unit for detecting an overlap period between a first speech period of the first speaker included in the first voice and a second speech period of the second speaker included in the second voice, which starts before the first speech period, or an interval between the first speech period and the second speech period; a state information extracting unit for extracting state information representing a state of the first speaker from the first speech period; and a state detecting unit for detecting the state of the first speaker in the first speech period based on the overlap period or the interval and the first state information.

8 Claims, 12 Drawing Sheets

(56) References Cited

OTHER PUBLICATIONS

Hama, Haruyo et al., "Invitation to Research on Emotions: Approach to Emotion & Affect", 1st edition, Saiensu-sha Co., Ltd. Dec. 10, 2001, pp. 137-174 (Partial English translation).

JPOA—Office Action of Japanese Patent Application No. 2011-079902 dated May 27, 2014 with English Translation of the Office Action.

* cited by examiner

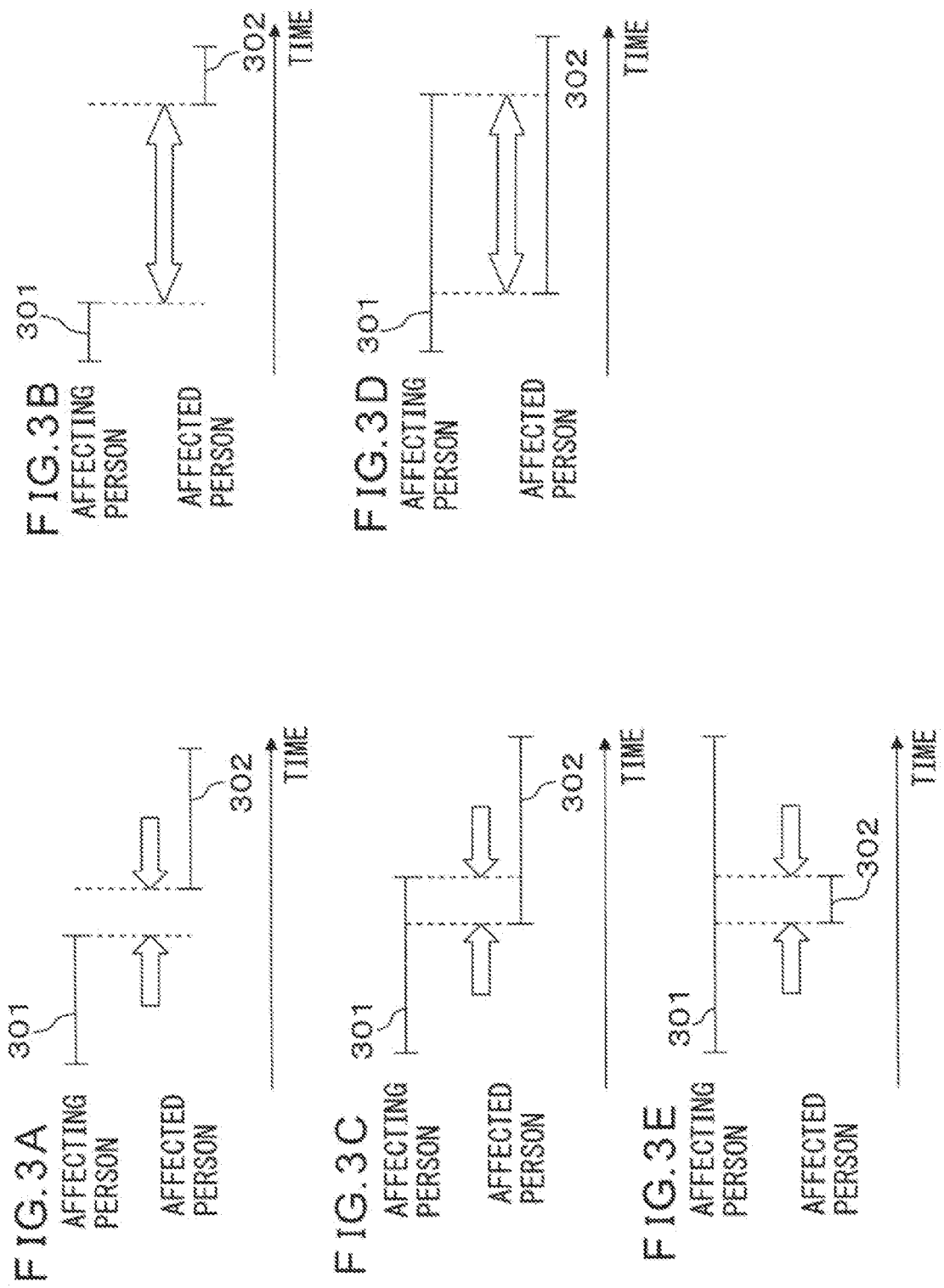

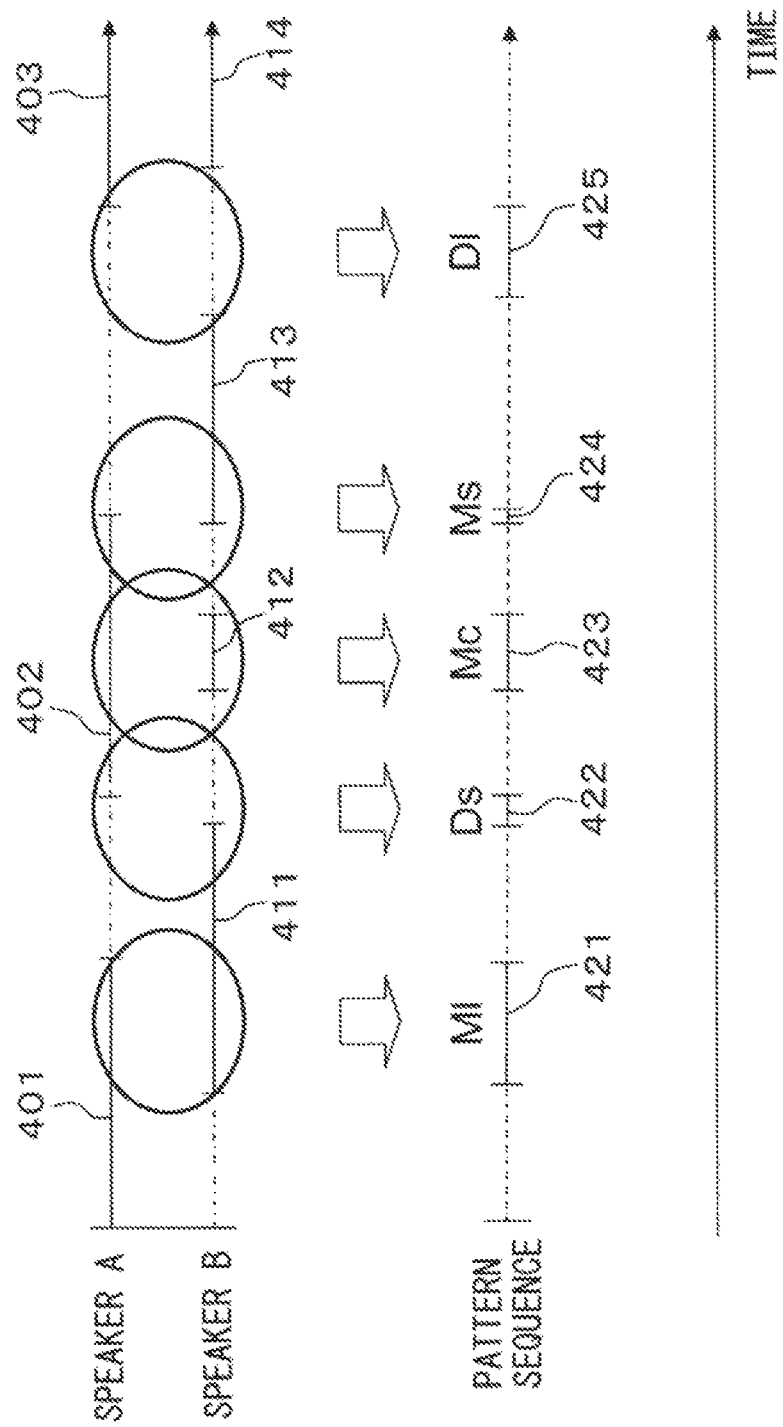

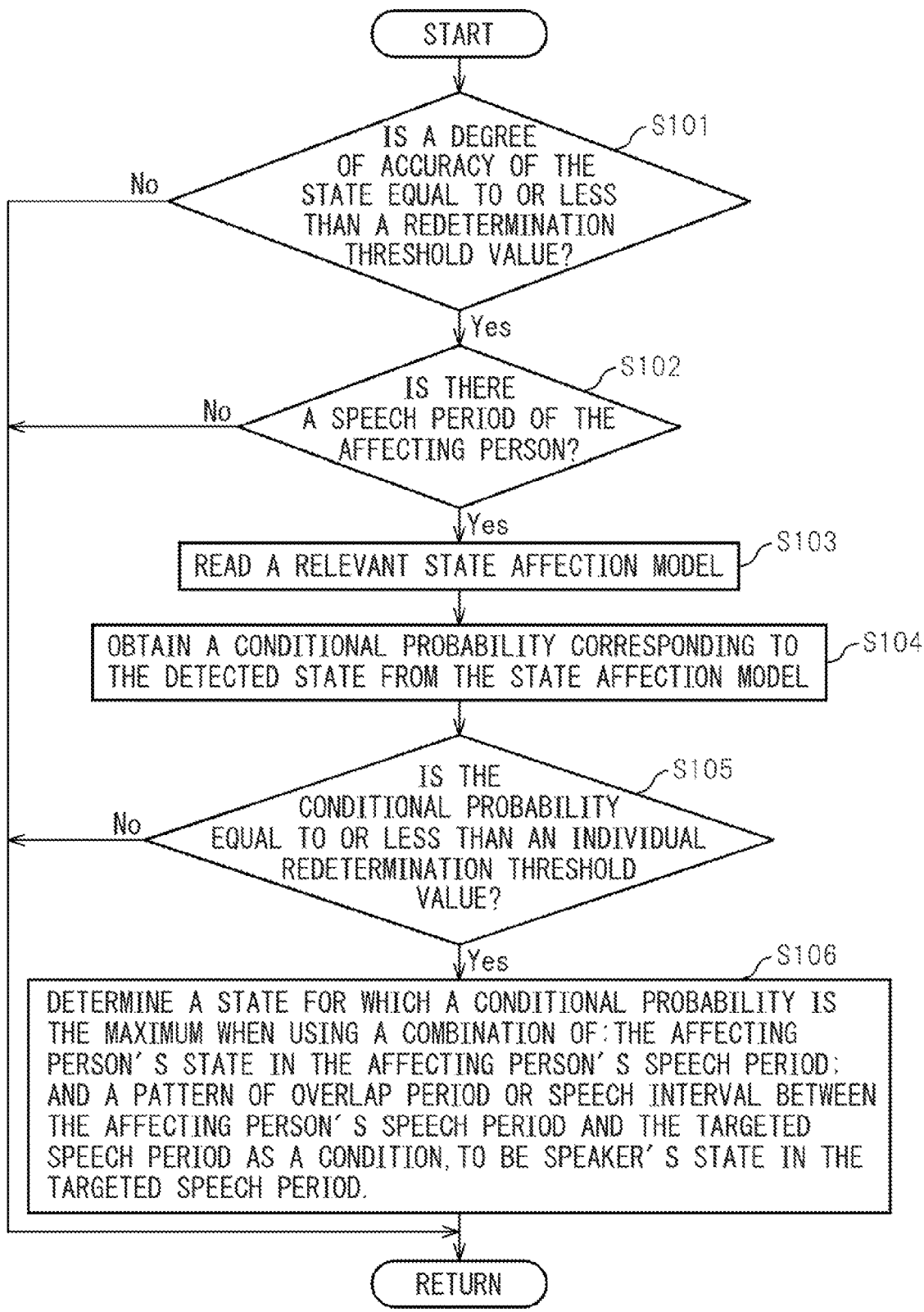

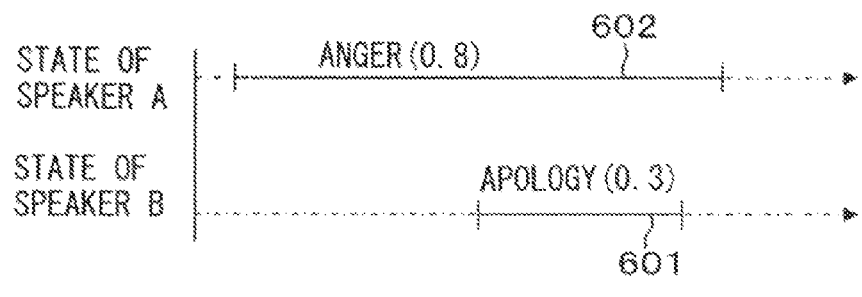
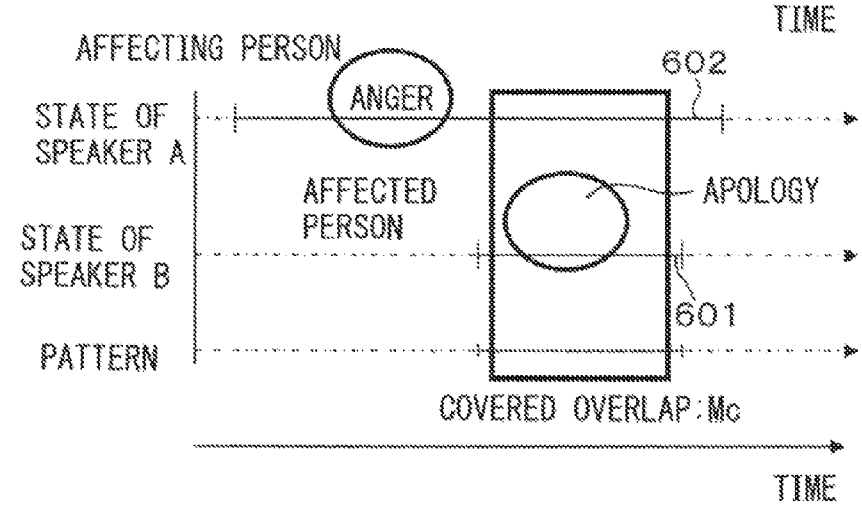
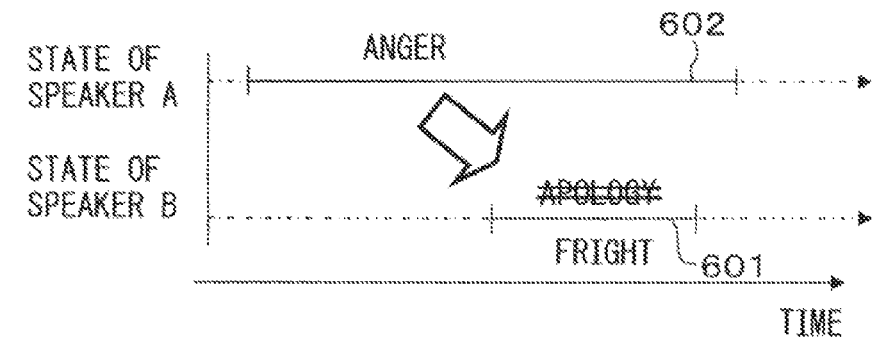

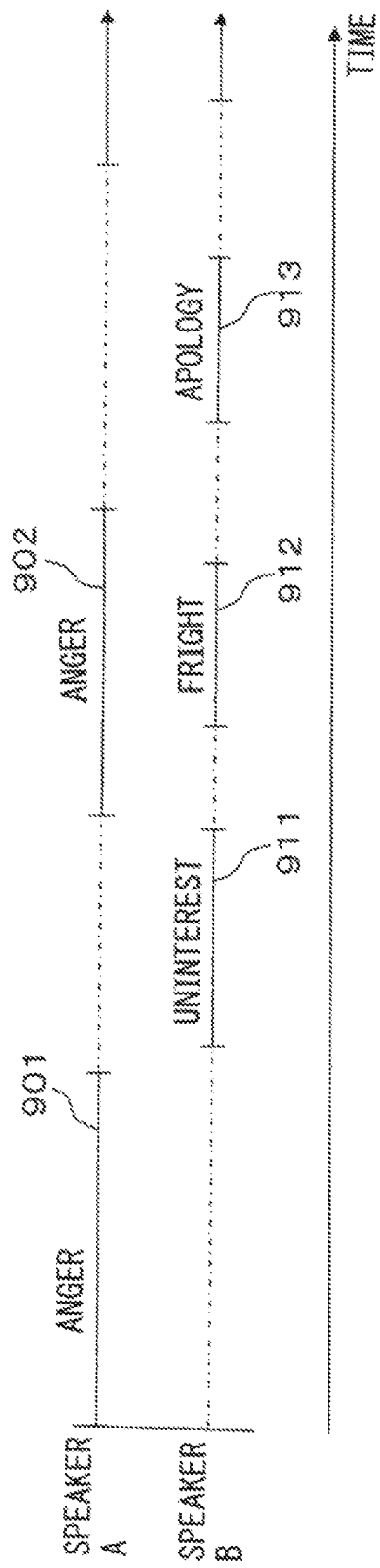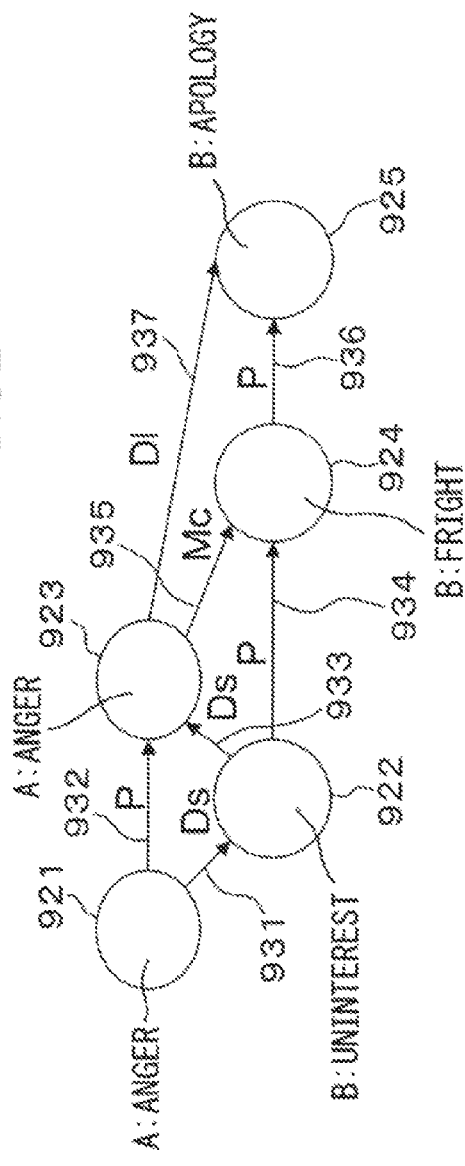

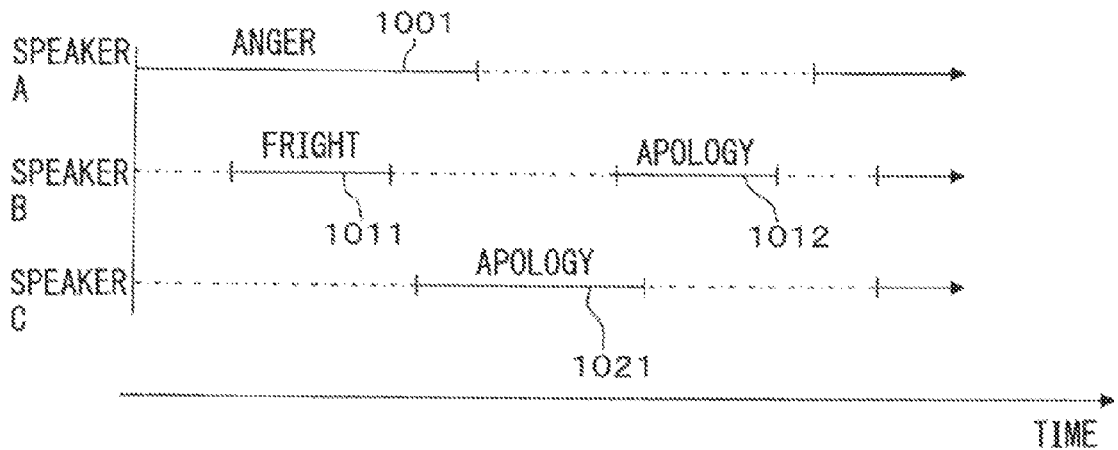
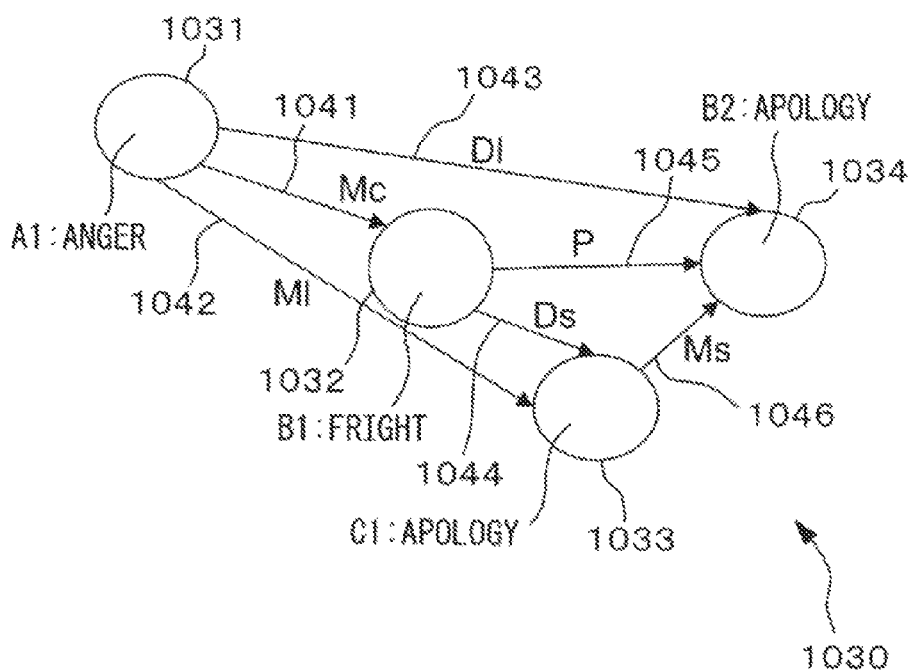

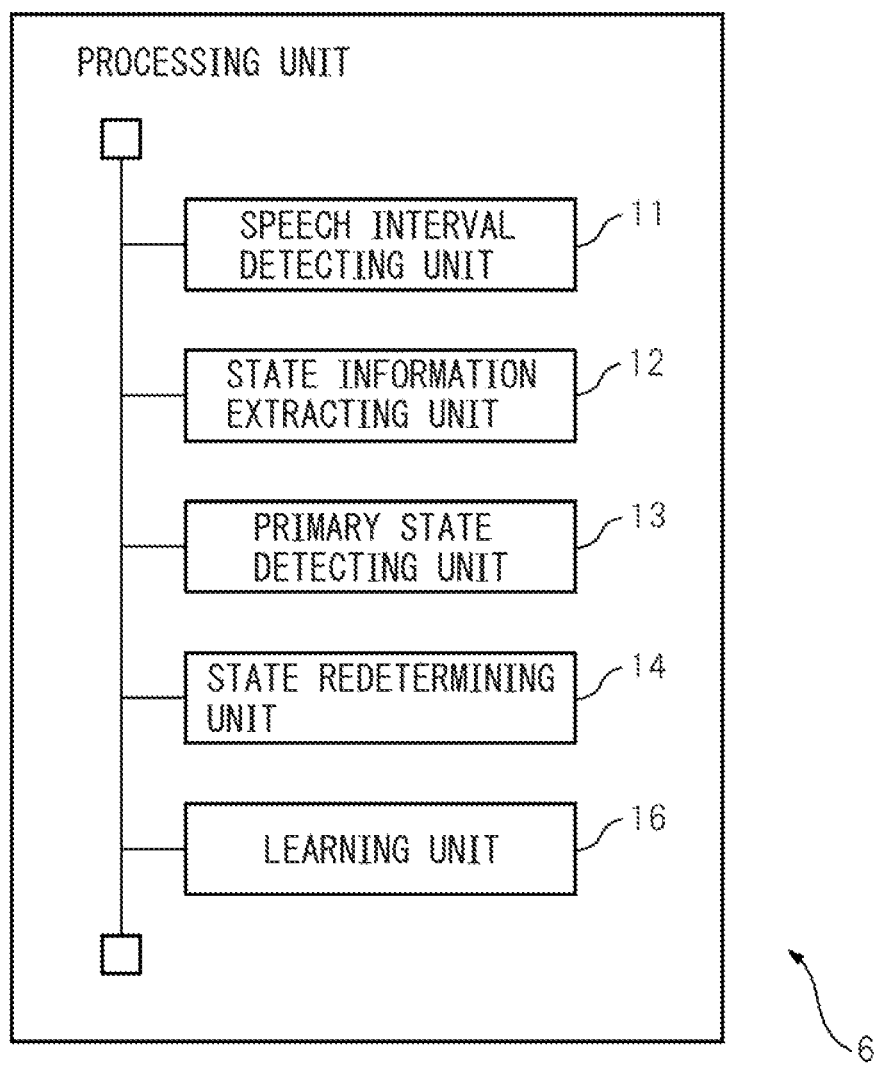

SPEAKER STATE DETECTING APPARATUS AND SPEAKER STATE DETECTING METHOD

CROSS-REFERENCE TO RELATED APPLICATION

This application is based upon and claims the benefit of priority of the prior Japanese Patent Application No. 2011-79902, filed on Mar. 31, 2011, and the entire contents of which are incorporated herein by reference.

FIELD

The embodiments discussed herein are related to a speaker state detecting apparatus, a speaker state detecting method and a computer program for detecting a state of a speaker, by which a state of any one of a plurality of speakers is determined based on voices emanated from the plurality of speakers who are in a dialogue with each other.

BACKGROUND

In recent years, a technique has been studied in which a state of a subject person such as his/her emotion, presence or absence of his/her feeling of stress or feeling of fatigue, or the like is identified by analyzing various kinds of biological information of the subject person.

There has been proposed a technique for determining a state of the subject person based on, for example, expression, posture or brain waves of the subject person, a signal from an electrocardiograph attached to the subject person, or the like (for instance, see Japanese Laid-open Patent Publication No. 2006-130121; coauthored by Haruyo HAMA, Naoto SUZUKI, Yasuhisa HAMA, "Invitation To Emotional Psychology, Approach To Feelings And Emotions", first edition, Saiensu-sha Co., Ltd. Dec. 10, 2001, p. 137-174; and coauthored by M. F. Bear, B. W. Connors, M. A. Paradiso, "Neuroscience, Exploring The Brain", first edition, Nishimura Co., Ltd. Jun. 5, 2007, p. 437-452).

There has been also proposed a technique for determining a feeling of the subject person based on voices or conversation emanated by the subject person (for instance, see Japanese Laid-open Patent Publication No. 2002-91482 and Japanese Laid-open Patent Publication No. 2004-259238). For example, an emotion detecting apparatus disclosed in Japanese Laid-open Patent Publication No. 2002-91482 obtains the amounts of change in an intensity, a tempo and intonation of a voice of the subject person, respectively, and based on the amounts of change, generates signals representing respective emotional states of at least anger, sadness and pleasure. An emotion understanding system disclosed in Japanese Laid-open Patent Publication No. 2004-259238 analyzes a dialogue context so as to understand emotions of a speaking person and a listening person.

In a technique for analyzing data of an electrocardiograph or brain waves of the subject person, an instrument for measuring the brain waves or the like is attached to the subject person in order to detect a state of the subject person. For this reason, this technique can be applied only to a location in which such an instrument is allowed to be set. In addition, in order to detect a state of the subject person based on expression or posture of the subject person, an image captured by shooting a face or an entire body of the subject person is used. For this reason, a technique for detecting a state of the subject person based on the expression or posture can not be applied thereto unless the subject person is within a shooting range of a camera. In contrast to this, a technique for detecting a state of the subject person based on his/her voice is widely applicable since the subject person is allowed to be within a range in which a microphone can collect voices of the subject person.

However, a device disclosed in Japanese Laid-open Patent Publication No. 2002-91482 detects a state of the subject person based on only voices of the subject person. For this reason, even if the subject person has a dialogue with other persons, this device can not take account of a state of the subject person suffering from an influence of the other persons. On the other hand, a system disclosed in Japanese Laid-open Patent Publication No. 2004-259238 converts voices of the dialogue into text information by use of, for example, a voice recognition system, and after that, analyzes the text information. However, if the voice is converted into text, then various kinds of nonverbal information such as intonation or strength of the voice, that are not converted into the text, are adversely lost, and so this system may be unable to accurately detect a state of the subject person.

SUMMARY

According to one embodiment, a speaker state detecting apparatus is provided. This speaker state detecting apparatus includes: an audio input unit for acquiring, at least, a first voice emanated by a first speaker and a second voice emanated by a second speaker; a speech interval detecting unit for detecting an overlap period between a first speech period of the first speaker included in the first voice and a second speech period of the second speaker included in the second voice, which starts before the first speech period, or an interval between the first speech period and the second speech period; a state information extracting unit for extracting first state information representing a state of the first speaker from the first speech period; and a state detecting unit for detecting the state of the first speaker in the first speech period based on the overlap period or the interval and the first state information.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 3A to 3E are schematic views representing examples of patterns of overlap periods or speech intervals, respectively.

FIG. 4 is a schematic view in which patterns of the overlap periods or speech intervals in a dialogue between two speakers are aligned in chronological order.

FIG. 5 is an operational flowchart of a speaker state redetermination process.

FIGS. 6A to 6C are illustrative diagrams of examples of state redetermination.

FIG. 9A is a schematic view illustrating one example of pattern of a plurality of speech periods included in a dialogue between two speakers and a state of a speaker in each speech period, and overlap periods or speech intervals of the speech periods.

FIG. 9B is a diagram illustrating one example of graphic pattern of combination of a state of an affecting person to be considered in a state affection model applied to the last speech period in FIG. 9A and the overlap periods or speech intervals.

FIG. 10A is a schematic view illustrating one example of pattern of a plurality of speech periods included in a dialogue among three speakers and a state of a speaker in each speech period and overlap periods or speech intervals of the speech periods.

FIG. 10B is a diagram illustrating one example of graphic pattern of combination of a state of an affecting person to be considered in a state affection model applied to the last speech period in FIG. 10A and the overlap periods or speech intervals.

FIG. 11 is a functional block diagram of a processing unit of a speaker state detecting apparatus according to a third embodiment.

DESCRIPTION OF EMBODIMENTS

Now description is started for speaker state detecting apparatuses according to different embodiments with reference to the drawings.

After having been dedicated to studying, the inventor has found that in the case of a dialogue taking place among a plurality of speakers, a degree of overlapping between voices let out by the speakers or an interval between the voices is affected by states of the speakers.

That is why this speaker state detecting apparatus detects a period in which voices let out by the speakers overlap each other or an interval between the voices, and detects a state of at least one speaker based on the detected overlap period or interval. In this specification, it should be noted that a state of a speaker means a notion including a spiritual state such as feeling of the speaker and a physical state such as tiredness of the speaker.

In the present embodiment, the speaker state detecting apparatus is incorporated in a telephone, and detects a state of at least one speaker from among a plurality of speakers having a conversation over the telephone network. The speaker state detecting apparatus, however, is not limited to this example, and as another example, may read voice data obtained by recording conversational speech made directly or over a communication line such as the telephone network by a plurality of speakers and detect a state of at least one speaker of the plurality of speakers. Furthermore, the speaker state detecting apparatus may collect voices of a plurality of speakers having direct communication by use of a microphone, separate the voices for the respective speakers and analyze the voices of the speakers, so as to detect a state of at least one speaker.

Figure 1:
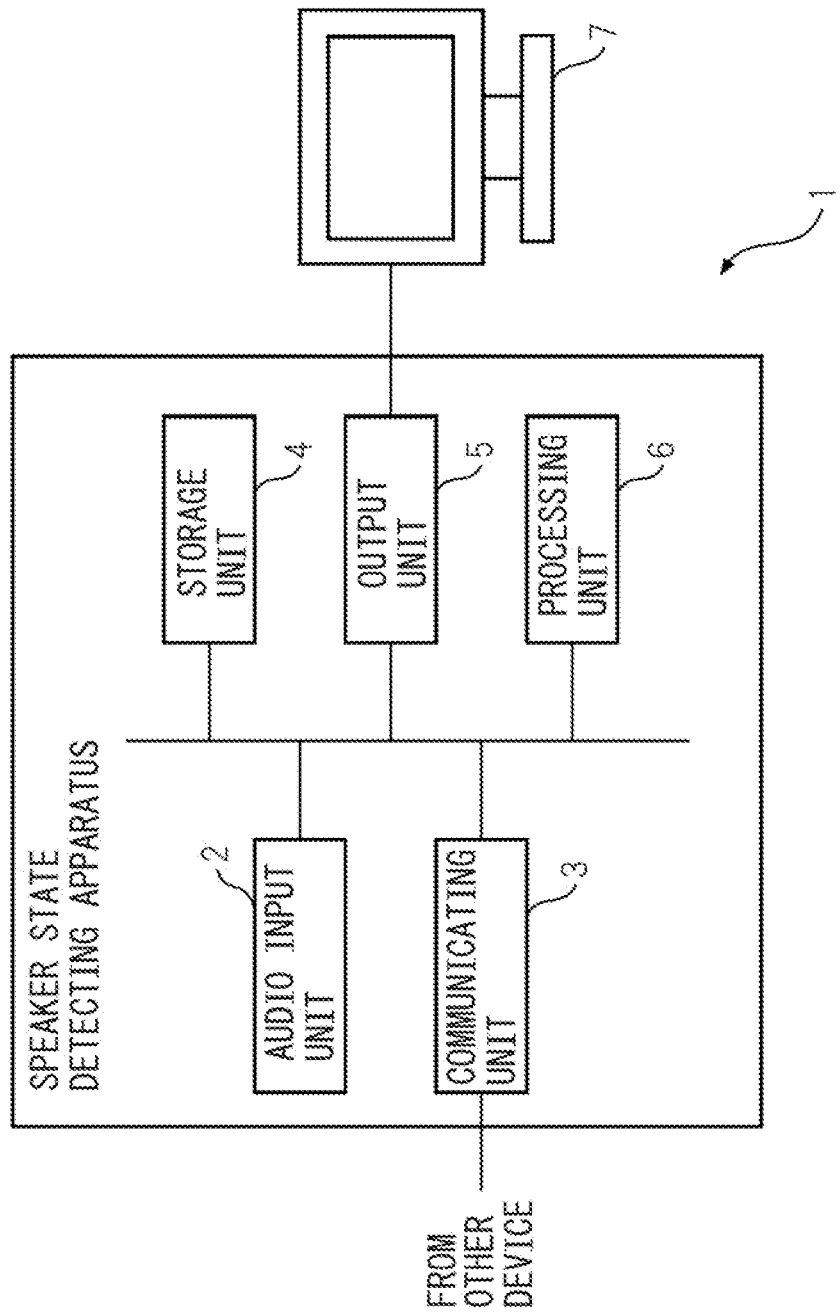
FIG. 1 is a schematic configuration diagram of a speaker state detecting apparatus according to a first embodiment.
Figure 2:
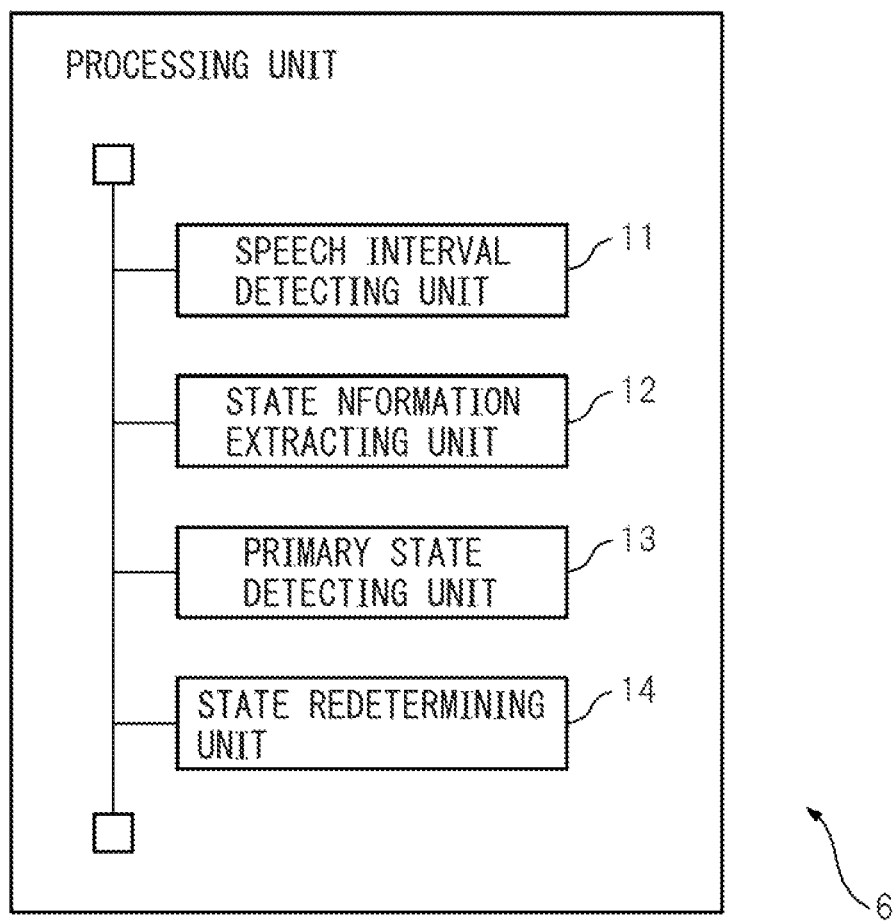
FIG. 2 is a functional block diagram of a processing unit owned by the speaker state detecting apparatus according to the first embodiment.

FIG. 1 is a schematic configuration diagram of a speaker state detecting apparatus according to one embodiment. In the present embodiment, the speaker state detecting apparatus 1 includes an audio input unit 2, a communicating unit 3, a storage unit 4, an output unit 5 and a processing unit 6.

The audio input unit 2 acquires data of a voice emanated by a first speaker. For this purpose, the audio input unit 2 has, for example, at least one microphone (not illustrated) and an analog-digital converter (not illustrated) connected with the microphone. In this situation, the microphone collects a voice emanated by one speaker situated around the microphone to generate an analog voice signal, and outputs the analog voice signal to the analog-digital converter. The analog-digital converter generates first voice data by sampling and digitizing the analog voice signal with a predetermined sampling period. Then, the analog-digital converter outputs the first voice data to the processing unit 6 connected with the analog-digital converter.

The communicating unit 3 is one alternative to the audio input unit, and has an interface circuit for connecting the speaker state detecting apparatus 1 to the telephone network. Over the telephone network, the communicating unit 3 receives a data stream including second voice data taking form of an electrical signal of a voice emanated by a second speaker. Then, the communicating unit 3 extracts the second voice data from the data stream. Herein, in the case where the second voice data are encoded in a predetermined channel coding system, the communicating unit 3 decodes the encoded second voice data in compliance with that channel coding system. Then again, the communicating unit 3 outputs the second voice data to the processing unit 6.

The first voice data and the second voice data are synchronized by the processing unit 6 in such a way that a relation between timings at which the speakers cause their voices, contained in these voice data, coincides with a relation between timings at which the speakers really emanate their voices.

The storage unit 4 has at least one of a semiconductor memory circuit, a magnetic storage device and an optical storage device, for example. The storage unit 4 then stores various kinds of computer programs used in the processing unit 6 and various kinds of data used in a speaker state detecting process. The storage unit 4 may also store voice data acquired through the audio input unit 2 or the communicating unit 3.

The data used in the speaker state detecting process, which are stored in the storage unit 4, include, for example, a state affection model to be used when a state of a speaker having been detected once is modified. Details of the state affection model will be described later.

The output unit 5 outputs detection result information representing a detection result of a speaker's state received from the processing unit 6, to a display device 7. To do so, the output unit 5 has, for example, a video interface circuit for connecting the display device 7 to a speaker state detecting apparatus 1. The output unit 5 may also output the detection result information to the other device that is connected with the speaker state detecting apparatus 1 via the communication network. In this case, the output unit 5 has an interface circuit intended to connect the speaker state detecting apparatus 1 to the communication network. In this case, the communicating unit 3 and the output unit 5 may be formed in the same circuit.

The processing unit 6 has one or more processors, a memory circuit and a peripheral circuit. The processing unit 6 causes the storage unit 4 to temporarily store the first voice data received from the audio input unit 2 and the second voice data received from the communicating unit 3. Then, the processing unit 6 detects a state of at least one speaker based on the voice data of the respective speakers. For realizing this, the processing unit 6 includes a speech interval detecting unit 11, a state information extracting unit 12, a primary state detecting unit 13 and a state redetermining unit 14.

These units owned by the processing unit 6 are configured, for example, as functional modules implemented by a computer program operating on the processor(s) owned by the processing unit 6. Alternatively, the units owned by the processing unit 6 may also be mounted on the speaker state detecting apparatus 1 in the form of separate circuits therefore, respectively.

A speech interval detecting unit 11 detects a period in which a voice of one speaker and a voice of the other speaker overlap with each other, or an interval between the voice of one speaker and the voice of the other speaker. To do so, the speech interval detecting unit 11 detects a voiced period having successive segments in which a sound volume is equal to or greater than a predetermined sound volume threshold value, from the first voice data. Then, the speech interval detecting unit 11 determines the voiced period to be one speech period of the first speaker each time the voiced period is detected. Likewise, the speech interval detecting unit 11 detects a voiced period having successive segments in which the sound volume is equal to or greater than the predetermined sound volume threshold value from the second voice data, and determines the voiced period to be one speech period of the second speaker. Herein, the sound volume threshold value is, for example, set to an envisaged minimum value of a voice let out by the speaker on the occasion of conversation via a telephone incorporated with the speaker state detecting apparatus 1. In addition, even in the case where a silent period in which the sound volume is lower than the sound volume threshold value separates two voiced periods forward and backward adjacent thereto, the speech interval detecting unit 11 may determine the two voiced periods to be one voiced period if a length of the silent period is shorter than a predetermined period of time. In this situation, the predetermined period of time is set, for example, to a period of time corresponding to intake of breath of the speaker, for example, about 0.5 to 1.0 second.

Additionally, the speech interval detecting unit 11 may detect a voiced period by examining the power of a spectrum in a frequency band including a frequency comparable to a human voice in the voice data. For instance, the speech interval detecting unit 11 may compute the Fourier transform or cosine transform of the first voice data and the second voice data per predetermined frame length (e.g., 64 milliseconds) to obtain frequency spectra of the respective voice data per frame. The speech interval detecting unit 11 computes, for each frame, the power of a spectrum of a frequency band (e.g., about 100 Hz to about 1 kHz) including a frequency comparable to a human voice. Then, the speech interval detecting unit 11 determines a period having successive frames in which the computed power is equal to or higher than a predetermined power threshold value to be a voiced period.

In order to make it possible to align speech periods of the respective speakers in chronological order, the speech interval detecting unit 11 stores a beginning time and an ending time of the speech period in the storage unit 4 for each speech period.

The speech interval detecting unit 11 compares the speech periods of the respective speakers in chronological order. If passage between a beginning time and an ending time of a targeted speech period of one speaker includes a beginning time of any speech period of the other speakers, then the speech interval detecting unit 11 determines that the speech periods overlap each other. On that basis, the speech interval detecting unit 11 determines a period from the beginning time of a temporally posterior speech period of the two overlapping speech periods to the ending time of any one of the speech periods to be an overlap period.

On the other hand, there may be a case where the passage between the beginning time and the ending time of a targeted speech period of the one speaker does not include a beginning time of any speech periods of the other speakers. In such a case, the speech interval detecting unit 11 determines a period from an ending time of the targeted speech period to a beginning time of a first speech period of the other speaker, which is posterior to the ending time, to be a speech interval.

Hereinafter, for the sake of convenience, of the two speech periods associated with the overlap period or the speech interval, a speech period having an earlier beginning time than the other speech period is called "a speech period of an affecting person", and a speech period having a later beginning time than the other speech period is called "a speech period of an affected person".

Furthermore, the speech interval detecting unit 11 classifies an overlap period or speech interval as any one of a plurality of patterns relating to states of the affected person according to lengths of the overlap period and the speech interval.

FIGS. 3A to 3E represent examples of patterns of the overlap period or the speech interval, respectively. In FIGS. 3A to 3E, a lateral axis is a time scale. A speech period 301 depicted on the upper side is a speech period of the affecting person, and on the other hand a speech period 302 depicted on the lower side is a speech period of the affected person.

A pattern represented in FIG. 3A is a pattern in which a speech period of the affecting person does not overlap a speech period of the affected person, and a speech interval is short or there is no speech interval. For the sake of expedience, such a pattern is referred to as "Ds". A pattern represented in FIG. 3B is a pattern in which a speech period of the affecting person does not overlap a speech period of the affected person, and a speech interval is long. As a matter of convenience, such a pattern is referred to as "Dl". A pattern represented in FIG. 3C is a pattern in which a part of a speech period of the affecting person overlaps a part of a speech period of the affected person, and the overlap period is short. For the convenience sake, such a pattern is referred to as "Ms". A pattern represented in FIG. 3D is a pattern in which a part of a speech period of the affecting person overlaps a part of a speech period of the affected person, and the overlap period is long. As a matter of convenience, such a pattern is referred to as "Ml". And a pattern represented in FIG. 3E is a pattern in which a whole of a speech period of the affected person overlaps with a speech period of the affecting person, and the speech period of the affected person, that is, the overlap period is shorter than the speech period of the affecting person. For the expedience sake, such a pattern of an overlap period in which one speech period is covered all over with the other speech period is referred to as "Mc".

It is noted that the speech interval detecting unit 11 determines that the overlap period is long if a length of the overlap period is equal to or greater than a predetermined overlap period threshold value, but determines that the overlap period is short if a length of the overlap period is less than the predetermined overlap period threshold value. The speech interval detecting unit 11 determines that the speech interval is long if a length of the speech interval is equal to or greater than a predetermined interval threshold value, but determines that the speech interval is short if a length of the speech interval is less than the predetermined interval threshold value. The overlap period threshold value is set to 2.5 seconds, for example, and the interval threshold value is set to one second, for example.

FIG. 4 is a schematic diagram in which patterns of the overlap periods or speech intervals in one example of conversation between two speakers are aligned in chronological order. In FIG. 4, a lateral axis indicates time. Speech periods 401-403 are speech periods of a speaker A, respectively, and speech periods 411-413 are speech periods of a speaker B. A voice of any one of the speakers A and B may be collected by the audio input unit 2. In addition, patterns 421-425 each correspond to one overlap period or speech interval.

In this example, the speech period 401 overlaps the speech period 411, and an overlap period therebetween is long. For this reason, the pattern 421 corresponding to that overlap period is classified as a "long overlap period (Ml)". Next, the speech period 411 does not overlap the speech period 402, and a speech interval therebetween is short. For this reason, the pattern 422 corresponding to that speech interval is classified as a "short speech interval (Ds)". Likewise, the patterns 423 and 424 corresponding to an overlap period of the speech period 402 and the speech period 412 and an overlap period of the speech period 402 and the speech period 413 are classified as a "covered overlap period (Mc)" and a "short overlap period (Ms)", respectively. Furthermore, the pattern 425 corresponding to a speech interval between the speech period 413 and the speech period 403 is classified as a "long speech interval (Dl)". It is noted that the speaker A is an affecting person and the speaker B is an affected person regarding the patterns 421, 423 and 424. Additionally, as to the patterns 422 and 425, the speaker B is an affecting person and the speaker A is an affected person.

The speech interval detecting unit 11 stores, for each of the overlap periods and speech intervals, the corresponding beginning time and ending time in the storage unit 4 together with identification information representing a pattern as which the corresponding overlap period or speech interval is classified.

The state information extracting unit 12 extracts, from a voice of at least one speaker, state information relating to a state of the speaker. In the present embodiment, the state information extracting unit 12 extracts at least one of a power, tempo, intonation and a statistic of temporal fluctuation degrees of predetermined frequency components of the voice, as state information for each speech period.

For instance, the state information extracting unit 12 may subject a voice of one speaker included in a speech period to a frequency transform such as the Fourier transform or the cosine transform per a predetermined frame length to obtain a frequency spectrum of the voice, so as to obtain the power of the voice. Then, the state information extracting unit 12 derives a mean square value of amplitudes of a spectrum in a frequency band comparable to a human voice of the frequency spectrum, and further derives the power of the voice by averaging the mean square value per frame with respect to a whole of a speech period.

The state information extracting unit 12 may detect a breakpoint for each phoneme contained in a voice within a speech period using a hidden Markov model per phoneme, for example, and detects the number of phonemes contained therein per unit time as a tempo. The unit time may be set to a period of time during which a plurality of phonemes are included in a usual conversation, e.g., several seconds to ten seconds.

In addition, the state information extracting unit 12 may detect each word contained in the voice within the speech period, and detect a characteristic pattern of the voice within the word or within the speech period as information representing an intonation. To this end, the state information extracting unit 12 detects a word using a word dictionary or N-gram, for example. The state information extracting unit 12 also computes a time-frequency transform of the voice within the speech period using a QMF filter bank, for example, to obtain a frequency spectrum for each time point. Then, the state information extracting unit 12 extracts a spectrum in a frequency band having high correlativity with intonation, e.g., 800 Hz to 1200 Hz, from the frequency spectra of the time points. The state information extracting unit 12 derives the square of the extracted spectrum as a power spectrum of a time point in question. The state information extracting unit 12 detects a time point at which the power spectrum has a predetermined threshold value or higher, that is, a time point at which the voice in a frequency band relevant to intonation has a strength of a certain degree or higher. The threshold value may be adaptively determined by use of a discriminant analysis method, for example, or may be a value that is beforehand set in a fixed manner. The state information extracting unit 12 obtains an interval between the detected time points as a parameter representing an intonation pattern. The state information extracting unit 12 derives an average value of the parameter for each word or for each speech period, and regards the average value as information representing intonation.

Additionally, in order to obtain a temporal fluctuation degree of a predetermined frequency component, the state information extracting unit 12 may extract a spectrum of a frequency band corresponding to high-frequency components of the human voice from a frequency spectrum per frame of the voice included in a speech period. The frequency band corresponding to the high-frequency components can be set to 2 kHz to 3 kHz, for example.

Next, the state information extracting unit 12 obtains a fluctuation degree of the extracted high-frequency components for each unit time (e.g., length of one frame). This fluctuation degree is computed according to the following equation, for example.

Fluctuation degree=log(geometric mean of a power spectrum of the high-frequency components)/log (arithmetic mean of a power spectrum of the high-frequency components)

Alternatively, the state information extracting unit 12 may compute the fluctuation degree according to the following equation.

Fluctuation degree=geometric mean of a power spectrum of the high-frequency components/arithmetic mean of a power spectrum of the high-frequency components The state information extracting unit 12 may derive statistics of the fluctuation degree within a speech period, obtained in the above-mentioned manner, e.g., a mean value, a median value, a dispersion value or a mode value of the fluctuation degrees for each frame, included in a speech period.

It is noted that the state information extracting unit 12 may extract any other kinds of state information than the above-mentioned state information. The state information extracting unit 12 stores the state information obtained for each speech period in the storage unit 4 in association with a speech period corresponding thereto.

The primary state detecting unit 13 detects a state of at lease one speaker for each speech period of the one speaker, for example, based on the state information for each speech period. To do so, the primary state detecting unit 13 detects a state of the speaker responding to the obtained state information by reference to, for example, a state database representing relations between sets of state information and states (states such as anger, pleasure and sadness) of a speaker. This state database is stored in the storage unit 4 in advance. Herein, the state database is created, for instance, by obtaining state information for each speech period with respect to multiple voice data samples for which states of a speaker are known in advance, obtaining a frequency distribution of a state of a speaker for each set of state information, and associating a state whose frequency is the highest with the set of state information. With respect to such voice data samples, a state of a speaker may, for instance, be obtained according to any of various techniques in which biological information such as pulsebeats of the speaker, data of an electrocardiograph and an image captured by shooting a face of the speaker is separately acquired when the voice data are collected, and a state of the subject person is obtained based on the biological information. Additionally, the state database may be beforehand prepared by other devices than the speaker state detecting apparatus 1.

Furthermore, the primary state detecting unit 13 obtains a degree of accuracy representing a likelihood of a detected state. In the present embodiment, the degree of accuracy has a value within a range of zero to one, and the larger the value is, the greater likelihood the detected state has. However, a range of values the degree of accuracy can have can be set to any range, e.g., zero to 10. The primary state detecting unit 13 derives the degree of accuracy by, for example, inputting a set of state information to a function having an input of a set of state information and an output of the degree of accuracy responding to the detected state. Such a function is stored in, for example, the storage unit 4 in advance.

Alternatively, the primary state detecting unit 13 may obtain degrees of accuracy for all possible states, respectively, by inputting sets of state information to a function having an input of a set of state information and an output of the degrees of accuracy of possible states the speaker can have. Then, the primary state detecting unit 13 detects a state whose degree of accuracy is the highest, as a state of the speaker. In this case, the primary state detecting unit 13 may determine the highest degree of accuracy to be a degree of accuracy of the detected state. Alternatively, the primary state detecting unit 13 may regard a normalized degree of accuracy obtained by dividing degrees of accuracy of the respective states by a sum of degrees of accuracy computed for all possible states, as a probability distribution, and may compute the reciprocal of an entropy of the probability distribution as a newly-set degree of accuracy.

Again, the primary state detecting unit 13 may use a signal-to-noise ratio in a speech period, that regards a length of a period in which the speaker has let out a voice as the signal and regards a length of a period in which any sound other than the voice of the speaker is made as the noise, as a degree of accuracy of a state made in the speech period. In this case, a period in which the speaker has let out the voice may be set, for example, to a period in which the power of a spectrum of a frequency band comparable to a human voice is equal to or greater than a predetermined threshold value.

Furthermore, the primary state detecting unit 13 may use a stochastic model having an input of a set of state information and an output of a conditional probability of each possible state of the speaker to obtain conditional probabilities of the respective states of the speaker by inputting a set of the state information extracted from the targeted speech period to the model. In this case, the primary state detecting unit 13 detects a state corresponding to the highest value of the conditional probability as a state of the speaker in the targeted speech period. Besides, the primary state detecting unit 13 uses the highest conditional probability as a degree of accuracy.

The primary state detecting unit 13 may use a Bayesian network, for example, as the stochastic model. In this case, the Bayesian network is learned in advance for determining a conditional probability of each state of the speaker based on the multiple voice data samples for which a state of the speaker has been known. For instance, the primary state detecting unit 13 uses a Bayesian network of two layers, which has an input node at which any state information is inputted and an output node at which respective conditional probabilities of the possible states the speaker can have. In this case, frequencies of sets of state information extracted from the samples, corresponding to states of the speaker are obtained, respectively. Then, for each combination of a set of state information and a state of the speaker, a conditional probability of each state of the speaker is determined by dividing a frequency of the combination by a sum of the frequencies.

The primary state detecting unit 13 may also obtain a state of the speaker for each speech period according to any one of other various methods for determining a state of the speaker based on the state information extracted from the voice data. The primary state detecting unit 13 outputs a detected state and a degree of accuracy for the state to the state redetermining unit 14.

The state redetermining unit 14 redetermines a state of the speaker based on a determination result of a state of at least one speaker by the primary state detecting unit 13 and an overlap period or interval detected by the speech interval detecting unit 11. Herein, the primary state detecting unit 13 and the state redetermining unit 14 constitute one example of a state detecting unit.

FIG. 5 is an operational flowchart of a speaker state redetermination process executed by the state redetermining unit 14. The state redetermining unit 14 executes the speaker state redetermination process for each speech period in chronological order.

The state redetermining unit 14 determines whether or not a degree of accuracy of a state corresponding to the targeted speech period is equal to or less than a redetermination threshold value for determining whether or not to execute redetermination of a state (step S101). The redetermination threshold value is decided in advance as described below, for example. First of all, the processing unit 6 adds an increment value obtained by dividing a difference between the maximum value and the minimum value of the degree of accuracy that can be outputted by the primary state detecting unit 13 by, for example, 100, to the minimum value, so as to make a provisional threshold value. It is noted that a value by which the difference between the maximum value and the minimum value of the degrees of accuracy is divided to obtain the increment value may be 1,000 or 10,000 according to the number of effective digits of the degree of accuracy. Then, with respect to a plurality of samples of the voice data for which a state of a speaker has been known in advance, the processing unit 6 derives an error rate of a detection result of a state of a speaker by the primary state detecting unit 13 for a speech period in which the degree of accuracy is lower than the provisional threshold value. The processing unit 6 derives the error rate for each provisional threshold value while changing the provisional threshold value by sequentially adding the increment value to the provisional threshold value. Then, the processing unit 6 determines a provisional threshold value for which the error rate is the maximum, to be a redetermination threshold value. It is noted that the above-mentioned procedure for deciding the redetermination threshold value may also be carried out by any apparatus other than the speaker state detecting apparatus 1.

If the degree of accuracy is higher than the redetermination threshold value (step S101, No), then the state redetermination unit 14 does not carry out redetermination of the state in the speech period, but regards a state detected by the primary detecting unit 13 as a state of the speaker in the speech period. After that, the state redetermination unit 14 terminates the speaker state redetermination process. On the other hand, if the degree of accuracy is equal to or lower than the redetermination threshold value (step S101, Yes), then the state redetermination unit 14 assumes that the targeted speech period is a speech period of the affected person and determines whether or not any speech period of the affecting person exists prior to the targeted speech period. For instance, the state redetermination unit 14 may make such determination by reference to a beginning time of the targeted speech period stored in the storage unit 4, a beginning time of a speech period of the other speaker prior to the targeted speech period, and/or the like. If there is no speech period of the affecting person (step S102, No), then the state redetermination unit 14 does not perform the redetermination of a state in the speech period, and regards the state detected by the primary state detecting unit 13 as a state of the speaker in the speech period. Then, the state redetermining unit 14 terminates the speaker state redetermination process.

On the other hand, if a speech period of the affecting person exists therein (step S102, Yes), then the state redetermination unit 14 reads out identification information of a pattern of an overlap period or speech interval corresponding to the speech period of the affecting person and the targeted speech period of the affected person. The state redetermination unit 14 identifies a state affection model corresponding to a set of that pattern and a state of the affecting person in the speech period of the affecting person, and reads out the identified affection model from the storage unit 4 (step S103).

The state affection model is a model represented by a combination of: a conditional probability for each of possible states the speaker can have in a speech period of the affected person when using a set of a pattern of an overlap period or speech interval and a state of the affecting person in a speech period of the affecting person as a condition; and an individual redetermination threshold value. A conditional probability p included in the state affection model is, for example, represented by the following equation.

$$p=p(c_a|c_b,P_{dm})$$

$c_a$ represents a state of the affected person in the targeted speech period, and $c_b$ represents a state of the affecting person in a speech period of the affecting person. $P_{dm}(\gamma\{Dl, Ds, Mc, Ml, Ms\})$ is a pattern of the overlap period or interval pattern. For instance, when $c_a$ is "apology", $c_b$ is "anger" and $P_{dm}$ is Ms, if p=0.6, then it is represented that a probability that a speech of the affected person shortly overlapped after a speech of the affecting person being angry in a conversation belongs to "apology" is 0.6. The individual redetermination threshold value is a threshold value used to determine whether or not to redetermine a state of a speaker using the relevant state affection model.

The state redetermination unit 14 obtains a conditional probability corresponding to a state of a speaker detected by the primary state detecting unit 13 for the targeted speech period, which is included in the read state affection model (step S104). Then, the state redetermination unit 14 determines whether or not the conditional probability is equal to or less than the individual redetermination threshold value (step S105). If the conditional probability is higher than the individual redetermination threshold value of the state affection model (step S105, No), then the state redetermination unit 14 regards a state detected by the primary state detecting unit 13 as a state of the speaker in the speech period. After that, the state redetermining unit 14 terminates the speaker state redetermination process.

On the other hand, if the conditional probability is equal to or less than the individual redetermination threshold value of the state affection model (step S105, Yes), then the state redetermining unit 14 obtains a combination of a state of the affecting person in a speech period of the affecting person and a pattern of an overlap period or speech interval. Then, the state redetermining unit 14 looks up the read state affection model so as to obtain a state of the affected person for which the conditional probability using the combination as a condition is the maximum, and regards the obtained state as a state of the speaker in the targeted speech period (step S106). Thereafter, the state redetermining unit 14 terminates the speaker state redetermination process.

According to an modification, the state redetermining unit 14 may skip procedures of the steps S104 and S105 and directly carry out a procedure of the step S106 if a degree of accuracy of a state of a speaker who is the affected person in the targeted speech period is equal to or lower than the redetermination threshold value.

Now an example of state redetermination will be described with reference to FIGS. 6A to 6C. In FIGS. 6A to 6C, a lateral axis is a time scale, and a speech period 601 is a speech period of a speaker B and a speech period to be redetermined in this example. In addition, a speech period 602 of a speaker A is a speech period of the affecting person, which affects the speech period 601. A state of the speaker A in the speech period 602 is determined to be "anger".

In this situation, as illustrated in FIG. 6A, a state of the speaker B is determined to be "apology" for the speech period 602 by the primary state detecting unit 13, and its degree of accuracy is 0.3. If the redetermination threshold value is a value higher than the degree of accuracy, e.g., 0.5, then a state of the speaker in the speech period 601 is an object to be redetermined since there is the speech period 602 of the speaker A that begins earlier than the speech period 601 of the speaker B.

Subsequently, the state redeterminating unit 14 identifies a state affection model for the speech period 601. In this situation, because a state of the speaker A in the speech period 602 of the speaker A, which affects the speech period 601, is "anger", and the speech period 601 is covered all over with the speech period 602, a pattern of the overlap period or the speech interval is "Mc". For this reason, the state redetermining unit 14 reads out a state affection model corresponding to a condition {"anger", Mc} from the storage unit 4, and compares a conditional probability P("apology"|"anger", Mc) included in the state affection model with an individual redetermination threshold value. For instance, if the conditional probability P is 0.2 and the individual redetermination threshold value is a value higher than the conditional probability, e.g., 0.3, then the state redetermining unit 14 obtains the maximum value from among the conditional probabilities of possible states the affected person can have, which makes the {"anger", Mc} a condition. For instance, in the state affection model, under a condition of combination of "anger" and the pattern "Mc", assume that conditional probabilities of the respective states "fright", "apology", "anger" and "calmness" have been obtained as forllows.

P("fright"|"anger", Mc)=0.4
P("apology"|"anger", Mc)=0.2
P("anger"|"anger", Mc)=0.3
P("calmness"|"anger", Mc)=0.1

In this assumption, the conditional probability of the state "fright" is the maximum. So, as illustrated in FIG. 6C, the redetermining unit 14 revises the state of the speaker B in the speech period 601 from "apology" to "fright".

Note that the conditional probability is determined in advance as described below, for example. With respect to multiple voice data samples in which two speakers have a dialogue and for which states of the speakers have been known in advance, a process similar to the process performed by the speech interval detecting unit 11 is curried out to obtain patterns of an overlap period or speech interval in speech periods of the speakers in chronological order. Then, for each combination of a possible state the affecting person can have and a pattern of an overlap period or speech interval, frequencies of the respective possible states the affected person can have are derived. By dividing the frequency of each state of the affected person by a sum of the frequencies, a conditional probability of each state of the affected person is derived for each combination of a possible state the affecting person can have and a pattern of the overlap period and speech interval.

Meanwhile, the individual redetermination threshold is decided in advance as described below, for example. With respect to the multiple voice data samples in which the two speakers have a dialogue and for which states of the speakers have been known in advance, the states of the speakers are detected for each speech period by performing a process similar to that in the state information extracting unit 12 and primary state detecting unit 13, and the sets of a speech period and a state of a speaker are each one test data block. However, these samples are preferably different from samples used for computation of the conditional probability.

Then, provisional threshold values are set ranging from 0.01 to 0.99 with 0.01 increments in between. For each provisional threshold value, there is extracted a test data block in which a conditional probability included in a state affection model with respect to a state of the affected person in a speech period of each test data block has a value lower than the provisional threshold value. For each of the extracted test data blocks, a state of the affected person whose probability is the maximum from among the conditional probabilities having the same condition as the condition used to determine a state of the speaker that is the affected person, in the test data block, becomes a state of the speaker after the change. The condition said here means combination of a state of the affecting person and a pattern of the overlap period and speech interval. Then, a reappearance rate and a matching rate are computed according to the following equations. The reappearance rate represents a ratio of appropriate result of change of a state of a speaker to speech periods for which a state of a speaker has been changed. The matching rate represents a ratio of the actually-changed state or states to speech periods for which a state of a speaker should be changed.

Reappearance rate=the number of speech periods for which a state of a speaker has changed to an appropriate state/the number of speech periods for which a state has been changed Matching rate=the number of speech periods for which a state of a speaker has been changed to an appropriate state/the number of speech periods for which a state should be changed    (1)

It is noted that if a state of a speaker which has been originally already-known for the test data block matches the changed state of a speaker, it is considered that a state of the speaker has been changed to an appropriate state. In addition, the number of speech periods for which a state should be changed is the number of speech periods for which a state of a speaker detected by performing a process similar to that in the state information extracting unit 12 and primary state detecting unit 13 is erroneous.

A threshold value using which a harmonic average between the reappearance rate and the matching rate is the maximum, from among the provisional threshold values mentioned above, is determined as the individual determination threshold value. The individual determination threshold value may also be determined for each set of a state of the affecting person and a pattern of the overlap period or speech interval. A conditional probability and an individual redetermination threshold value included in the state affection model may be prospectively determined according to the above-described procedure by any other apparatus than the speaker state detecting apparatus 1.

The state redetermining unit 14 stores a determination result of a state of the speaker in the storage unit 4 for each speech period in association with beginning time and ending time of the corresponding speech period. Also the state redetermining unit 14 may output the determination result of a state of the speaker to the display device 7 or other devices via the output unit 5.

Figure 7:
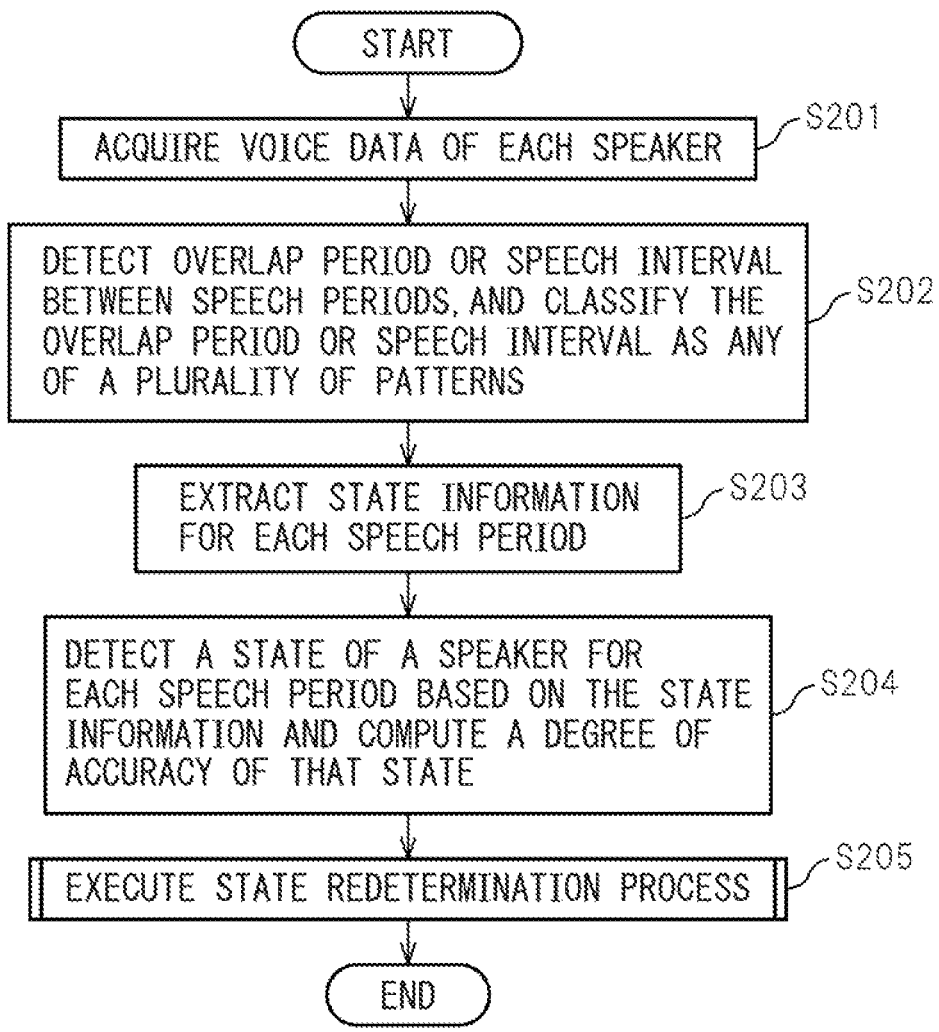
FIG. 7 is an operational flowchart of a speaker state detecting process.

FIG. 7 illustrates an operational flowchart of a speaker state detecting process executed by the processing unit 6 of the speaker state detecting apparatus 1.

The processing unit 6 acquires voice data of each of the speakers via the audio input unit 2 and the communicating unit 3 (step S201). The processing unit 6 synchronizes the voice data of the speakers and temporarily stores the resultant voice data in the storage unit 4. Next, the speech interval detecting unit 11 of the processing unit 6 detects speech periods for the voice data of the speakers, respectively. Then, the speech interval detecting unit 11 obtains an overlap period or speech interval between the speech periods of the speakers in chronological order, and classifies the overlap period or speech interval as any of the plurality of patterns (step S202). The speech interval detecting unit 11 stores beginning times and ending times of the respective speech periods in the storage unit 4. The speech interval detecting unit 11 also stores the beginning time and ending time of a pattern of the overlap period or speech interval, and identification information representing the pattern in the storage unit 4.

On the other hand, the state information extracting unit 12 of the processing unit 6 extracts state information for each speech period (step S203). Then, the state information extracting unit 12 stores the state information obtained for each speech period in the storage unit 4 in association with the corresponding speech period. The primary state detecting unit 13 of the processing unit 6 detects, for each speech period, a state of a speaker letting out the voice in the speech period, in the speech period based on the corresponding state information, and computes a degree of accuracy of the state (step S204). The primary state detecting unit 13 outputs the detected state and the degree of accuracy for the state to the state redetermining unit 14 of the processing unit 6.

The state redetermining unit 14 executes the state redetermination process for each speech period in chronological order (step S205). Then, the state redetermining unit 14 outputs a state of a speaker on a speech period basis to the display device or the other devices via an output unit 5 together with beginning time and ending time of the corresponding speech period. The redetermining unit 14 also stores the state of a speaker on a speech period basis in the storage unit 4 in association with the beginning time and ending time of the corresponding speech period. After that, the processing unit 6 terminates the speaker state detecting process.

As discussed above, this speaker state detecting apparatus detects a state of a speaker using an overlap period or speech interval between a speech period of one speaker and a speech period of the other speaker, which has relevance to the states of the speakers. Thereby, this speaker state detecting apparatus can improve a detection accuracy of a state of a speaker.

According to a modification, the audio input unit of the speaker state detecting apparatus may have an interface circuit complying with a serial bus standard such as Universal Serial Bus (USB). In this case, the audio input unit may be connected with a magnetic storage device such as hard disc drive, an optical storage device or a semiconductor memory circuit, for example, and may read out digitized voice data obtained by recording a dialogue of the two speakers from these storage devices and output the voice data to the processing unit.

Alternatively, the speaker state detecting apparatus may acquire the digitized voice data obtained by recording the dialogue of the two speakers from other equipment via the communicating unit. Then, the speaker state detecting apparatus may detect a state of each speaker on a speech period basis based on the voice data.

In this situation, the processing unit identifies a speaker for each speech period. For instance, when the voice data are a sort of data obtained by recording the dialogue in stereo, the processing unit may identify the speaker by determining whether a signal included in the speech period belongs to a right channel or a left channel. In turn, the processing unit derives an average strength of the signal from the beginning time of the targeted speech period to the ending time thereof for each channel. If the average strength of the left channel is higher than the average strength of the right channel, then the processing unit regards a speaker of the speech period as a first speaker, but if the average strength of the right channel is higher than the average strength of the left channel, then it regards a speaker of the speech period as a second speaker. Note that if both of the average strength of the left channel and the average strength of the right channel are greater than a predetermined threshold value, it is estimated that both speakers are speaking. Then, in this situation, the processing unit determines a speaker of the speech period to be both the first and second speakers. Herein, the predetermined value is set to the maximum of a sound volume when there is no person speaking, for example.

According to another modification, a threshold value for the overlap period and a threshold value for the interval may also be determined based on multiple voice data samples whose state of a speaker has been known in advance. For instance, while the threshold value for the overlap period and the threshold value for the interval are varied with each step of 0.1 seconds ranging from 0.5 seconds to 5 seconds, a conditional probability of a speaker who is the affected person with respect to the combination of the state of a speaker who is the affecting person and a pattern of the overlap period or speech interval is calculated based on the sample data. Then, the speech interval detecting unit 11 may use an threshold value for the overlap period and a threshold vale for the interval, for example, whose entropy is the minimum for a distribution of the respective conditional probabilities.

Next, a speaker state detecting apparatus according to a second embodiment is described. A speaker state detecting apparatus according to the second embodiment redetermines a state of a speaker in the targeted speech period not only based on a particular speech period of the other speaker immediately before the targeted speech period, but also based on states of speakers in a plurality of speech periods before the targeted speech period, and patterns of the overlap periods or speech intervals between the speech periods before the same. This speaker state detecting apparatus may also deal with three or more speakers.

Now description is given for points different from those of the speaker state detecting apparatus according to the first embodiment, of elements of the speaker state detecting apparatus according to the second embodiment.

The speaker state detecting apparatus according to the second embodiment also includes an audio input unit 2, a communicating unit 3, a storage unit 4, an output unit 5 and a processing unit 6 as with the speaker state detecting apparatus illustrated in FIG. 1. However, in this embodiment, the audio input unit 2 has a plurality of microphones arranged in different positions so as to be able to identify the speakers from data of voices collected by the audio input unit 2 in the case of a plurality of speakers existing. Then, an audio signal from each microphone is sent to the processing unit 6. In addition, the communicating unit 3 may be omitted in this embodiment.

Figure 8:
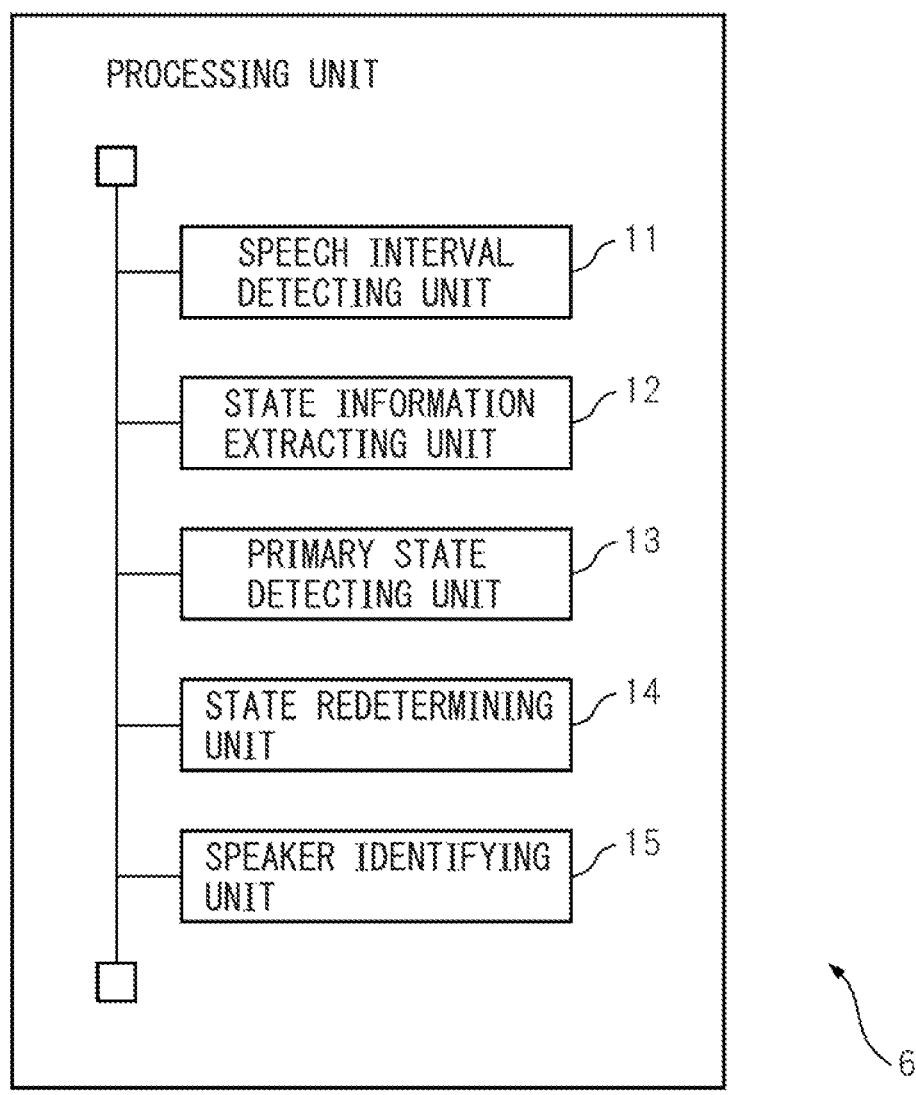
FIG. 8 is a functional block diagram of a processing unit of a speaker state detecting apparatus according to a second embodiment.

FIG. 8 is a functional block diagram of the processing unit of the speaker state detecting apparatus according to the second embodiment. The processing unit 6 includes a speaker interval detecting unit 11, a state information extracting unit 12, a primary state detecting unit 13, a state redetermining unit 14 and a speaker identifying unit 15. Among them, the speaker interval detecting unit 11, the state information extracting unit 12, the primary state detecting unit 13 and the state redetrermining unit 14 have a process similar to a process of the corresponding constitutional components of the processing unit 6 according to the first embodiment. For this reason, hereinafter will be given description about a state affection model used in the state redetermining unit 14 and the speaker identifying unit 15.

The speaker identifying unit 15 classifies the voice data inputted from the audio input unit 2 according to each speaker. For instance, if the microphones equipped in the audio input unit 2 are placed near any one of a plurality of speakers, respectively, then the speaker identifying unit 15 regards voice data generated by the microphones as voice data of a speaker who is the nearest to the microphone.

The speaker identifying unit 15 may identify a speaker by estimating an arrival direction of the voice based on a time difference between voices reaching the microphones. For instance, in the case of three speakers, the speaker identifying unit 15 obtains the arrival direction of the voice at the time at which strengths of voices collected by all the microphones reach a predetermined threshold value or higher. Then, at the time when the arrival direction of the voice is in a predetermined, first range of angle where a midpoint of a location in which the plurality of microphones are placed is used as a reference, the speaker identifying unit 15 regards a speaker in a period from that time point to a time when the strength of voices collected by the microphones is below the threshold value thereof, as a first speaker. On the other hand, when the arrival direction of the voice in the period deviates from the first range of angle and is included in a second range of angle, the speaker identifying unit 15 regards a speaker in that period as a second speaker. Furthermore, when the voice coming direction for the period deviates from the first and second ranges of angle, the speaker identifying unit 15 regards the speaker in that period as a third speaker. Note that the first and second ranges of angle are determined in advance according to positions of the speakers and positional relations among the microphones.

The speaker identifying unit 15 sends the identified voice data to the speech interval detecting unit 11 for each speaker.

Based on a state affection model correlated with speech periods of three or more speakers or a state affection model correlated with a plurality of speech periods previous to the targeted speech period, the state redetermining unit 14 may redetermine a state of a speaker detected by the primary state detecting unit for the targeted speech period.

FIG. 9A illustrates one example of a plurality of speech periods included in a dialogue of the two speakers and a state of one of the speakers in each speech period, and patterns of an overlap period or speech interval of the speech periods. FIG. 9B is a diagram illustrating one example of a graphic pattern of a combination of a state of the affecting person and an overlap period or speech interval which are considered in a state affection model applied to the last speech period in FIG. 9A.

In FIG. 9A, a lateral axis is a time scale. Speech periods 901 and 902 are speech periods of a speaker A, respectively, and speech periods 911 to 913 are speech periods of a speaker B, respectively. States of the speaker A in the speech periods 901 and 902 are determined to be "anger", respectively. On the other hand, states of the speaker B in the speech periods 911 and 912 are determined to be "uninterest" and "fright", respectively. The states of the speakers in these speech periods are results determined by the state redetermining unit 14. Then, the state of the speaker B in the speech period 913 that is the last speech period is determined to be "apology" in the primary state detecting unit 13.

In this example, the speech period 913 is a speech period of the affected person, and all the speech periods to be considered in the redetermination of a state of the speech period 913 serve as speech periods of the affecting person regardless of whether each of them is a speech period of any one of the speakers A and B. Then, as illustrated in FIG. 9B, a graphic pattern 920 for the speech period 913 includes nodes representing the respective speech periods and arrows connecting between the nodes corresponding to two speech periods, representing a pattern of an overlap or speech interval between the temporally successive, two speech periods. In addition, a beginning time of a speech period corresponding to a node on a root side of the arrow is earlier than a beginning time of a speech period corresponding to a node on a tip side of the arrow. For instance, the nodes 921-925 correspond to the speech periods 901, 911, 902, 912 and 913, respectively. The arrows 931 and 933 represent patterns of an overlap period or speech interval between the speech periods 901 and 911 and between the speech periods 911 and 902, respectively, and in this example, represent each a "short speech interval (Ds)". Additionally, the arrows 932, 934 and 937 refer to patterns of an overlap period or speech interval between the speech periods 901 and 902, between the speech periods 911 and 912 and between the speech periods 912 and 913, respectively, and in this example represent each a "speech interval (P) of one and the same person". Likewise, the arrow 935 refers to a pattern of an overlap period or speech interval between the speech periods 902 and 912, and in this example, represents an "covered overlap period (Mc)". And the arrow 937 refers to a pattern of an overlap period or speech interval between the speech periods 902 and 913, and in this example represents a "long speech interval (Dl)".

FIG. 10A illustrates one example of a plurality of speech periods included in a conversation among three speakers and a state of one of the speakers in each speech period, and patterns of an overlap period or speech interval between the speech periods. FIG. 10B is a diagram illustrating one example of a graphic pattern of a combination of a state of the affecting person and an overlap period or speech interval, which are considered in a state affection model applied to the last speech period in FIG. 10A.

In FIG. 10A, a lateral axis is a time scale. A speech period 1001 is a speech period of a speaker A, speech periods 1011 and 1012 are speech periods of a speaker B. A speech period 1021 is a speech period of a speaker C. A state of the speaker A in the speech period 1001 is determined to be "anger", and a state of the speaker B in the speech period 1011 and a state of the speaker C in the speech period 1021 are determined to be "fright" and "apology", respectively. These states of the speakers in the speech periods are the results determined by the state redetermining unit 14. Then, a state of the speaker B in the speech period 1012 that is the last speech period is determined to be "apology" by the primary state detecting unit 13.

Even in this example, the last speech period 1012 is a speech period of the affected person, and all the speech periods to be considered in the redetermination of a state of the speech period 1012 serve as speech periods of the affecting person regardless of whether each of them is a speech period of any of the speakers A, B and C. Then, as illustrated in FIG. 10B, a graphic pattern 1030 for the speech period 1012 includes nodes representing the respective speech periods, and arrows connecting between the nodes corresponding to two speech periods, which represent a pattern of an overlap period or speech interval between the temporal successive, two speech periods. For instance, the nodes 1031-1034 correspond to the speech periods 1001, 1011, 1021 and 1012, respectively. In addition, the arrows 1041-1043 refer to patterns of an overlap period or speech interval between the speech periods 1001 and 1011, between the speech periods 1001 and 1021 and between the speech periods 1001 and 1012, respectively, and represent a "covered overlap period (Mc)", a "long overlap period (Ml)" and a "long speech interval (Dl)", respectively. The arrows 1044 and 1045 refer to patterns of an overlap period or speech interval between the speech periods 1011 and 1021 and between speech periods 1011 and 1012, respectively, and in this example represent a "short speech interval (Ds)" and a "speech interval (P) of one and the same person". Then, the arrow 1046 refers to a pattern of an overlap period or speech interval between the speech periods 1021 and 1012, and in this example represents a "short overlap period (Ms)".

When the graphic pattern is generated, the state redetermining unit 14 regards a speech period to be subjected to a redetermination process of a state as a speech period of the affected person, and reads out a predefined number (n−1) of states of speech periods from the storage unit 4 one by one back in time in the inverse order of the beginning times from that speech period. However, n is the number of nodes and an integer of two or more. The state redetermining unit 14 reads all patterns of an overlap period or speech interval between the speech periods with respect to speech periods for the number of nodes from the storage unit 4. Then, the state redetermining unit 14 sets one node for each speech period, and as illustrated in FIG. 9B or FIG. 10B, can produce a graphic pattern by setting a pattern of an overlap period or speech interval between the successive, two speech periods as an arrow connecting between the two speech periods.

As illustrated in these examples, a relation between the two successive speech periods of the same speaker may be included in one example of a pattern of the overlap period or speech interval. Alternatively, a relation between two successive speech periods of the same speaker may be excluded from the graphic pattern. An upper limit of the number (namely, n−1) of speech periods referenced as a speech period of the affecting person is determined in advance according to a processing ability of the processing unit 6, and set to about 2 to 10, for example. Alternatively, all the speech periods that are situated on or after the last breakpoint of the dialogue among breakpoints of the dialogue included in the voice data, anterior to the speech period of the affected person, and situated before the speech period of the affected person may be set to speech periods of the affecting person. Note that the state redetermining unit 14 may, for example, detect a location where a segment is continued for a determined period or more, in which strengths of voice signals in the voice data of the all speakers are less than a predetermined threshold value, as a breakpoint of the dialogue. In this case, the predetermined period is set, for example, to ten seconds to one minute. The predetermined threshold value is set to the maximum value of the strength of expected background sound, for example.

The state redetermining unit 14 uses a set of: a state of each speech period of the affecting person represented by a graphic pattern as described above; and a pattern of an overlap period or speech interval, as a condition. Then, the state redetermining unit 14 looks up a state affection model and compares a conditional probability of a state of the affected person detected by the primary state detecting unit 13 under that condition with an individual redetermination threshold value. If the conditional probability is less than the individual redetermination threshold value, then the state redetermining unit 14 obtains a state of the affected person in which a conditional probability is the maximum value using a combination represented by the graphic pattern as a condition by reference to the state affection model. Then, the state redetermining unit 14 revises a state of the affected person to a state corresponding to the maximum value. For example, the conditional probability P is represented as follows in this embodiment.

$$P=P(c_a|G)$$

$c_a$ represents a state of the affected person in the targeted speech period, and G is in matrix notation of a graphic pattern representing a combination of a state of each speech period of the affecting person and a pattern of an overlap period or speech interval. For instance, the graphic pattern 1030 illustrated in FIG. 10B is indicated as follows.

$$G = \begin{pmatrix} x & Ms & P & D1 \\ \phi & apology & Ds & M1 \\ \phi & \phi & fright & Mc \\ \phi & \phi & \phi & anger \end{pmatrix} \quad (2)$$

An on-diagonal element on the upper-left end of the matrix G represents a state of a speech period of the affected person. However, since the state of the speech period of the affected person has not been finally decided, the on-diagonal element on the upper-left end is represented by a symbol "x" indicating the unknown, in this example. In addition, regarding the other on-diagonal elements of the matrix G, as the element is closer to the upper-left, a speech period associated with a state of the affecting person represented by the element is closer to the speech period of the affected person. Then, elements of i-th row and j-th column (i<j) positioned in the upper-right from the on-diagonal elements represents patterns of an overlap period or speech interval between an speech period corresponding to an on-diagonal element i and a speech period corresponding to an on-diagonal element j (i<j). On the other hand, each element located on the lower-left side of the on-diagonal elements and an element having no pattern of the corresponding overlap period or speech interval are expressed by a symbol (in this example, φ) representing absence of any pattern. When a graphic pattern is expressed in such a matrix notation, this matrix is an upper triangular matrix. For this reason, when generating or looking up a state affection model, only an element or elements having an effective value in the upper triangular matrix may be stored in the storage unit 4 or also looked up.

Even in this embodiment, when various graphic patterns included in the state affection model are used as conditions, a conditional probability that a speaker has a certain state and an individual redetermination threshold value are determined in much the same procedure as a procedure for determining a state affection model according to the first embodiment.

However, when determining the conditional probability, frequencies of the respective possible states of the affected person can have are obtained for each of the various graphic patterns, from the multiple voice data samples in which two or more speakers have a conversation, for which states of the speakers have been known in advance. Then, by dividing a frequency of each state of the affected person by a sum of the frequencies, a conditional probability of each state of the affected person for each graphic pattern can be obtained.

The speaker state detecting apparatus according to the second embodiment can use states of the speakers in a plurality of speech periods before the targeted speech period and an overlap period or speech interval between the two of the plurality of speech periods to determine a state of the speaker in the targeted speech period. In this way, since many sorts of information useful for determining a state of a speaker can be used, the speaker state detecting apparatus according to the second embodiment can more improve a detection accuracy of a state of a speaker.

Next, a speaker state detecting apparatus according to a third embodiment. The speaker state detecting apparatus according to the third embodiment stores a state of a speaker detected for a speech period, a pattern of the relevant overlap period or speech interval and the like are stored as samples for learning purposes, and updates a state affection model using the samples.

The speaker state detecting apparatus according to the third embodiment differs in respect of only part of a function to be executed by a processing unit as compared to the speaker state detecting apparatus according to the first embodiment. So, hereinafter, the processing unit will be described.

FIG. 11 is a functional block diagram of a processing unit of the speaker state detecting apparatus according to the third embodiment. The processing unit 6 includes a speech interval detecting unit 11, a state information extracting unit 12, a primary state detecting unit 13, a state redetermining unit 14 and a learning unit 16. From among them, the speech interval detecting unit 11, the state information extracting unit 12 and the primary state detecting unit 13 deal with much the same process as a process of the corresponding constituent elements of the processing unit 6 according to the first embodiment. So, hereinafter, the state redetermining unit 14 and the learning unit 16 will be described.

The state redetermining unit 14 redetermines a state of a speaker for each speech period with performing much the same process as a process of the state redetermining unit 14 according to the first embodiment. In the case where a determination result of the state of the speaker is probable, information on a speech period corresponding to the determination result is useful for improving an accuracy of a state affection model. In particular, in a circumstance where at least one speaker is limited to a specified speaker, such as the case where the speaker state detecting apparatus is implemented in a mobile phone, the speaker state detecting apparatus can be improved in detection accuracy of a state of a speaker with optimizing the state affection model using information on the specified speaker. If the detected state of the speaker is probable, the state redetermining unit 14, in turn, regards the corresponding speech period as a speech period of the affected person and a speech period of the other speaker immediately prior thereto as a speech period of the affecting person. Then, the state redetermining unit 14 additionally stores a set of a state of a speaker in each speech period and a pattern of overlap period and speech interval as a sample of learning purposes in the storage unit 4.

It is noted that, for instance, when a degree of accuracy of a state of a speaker detected in the targeted speech period is higher than a redetermination threshold value, the state redetermining unit 14 determines the state of the speaker to be probable. Alternatively, the state redetermining unit 14 may use a selection threshold value for determining whether or not to save a set of a state of a speaker in each speech period and a pattern of overlap period and speech interval as a sample for leaning purposes, separately from the redetermination threshold value. In this case, when a degree of accuracy of the state of the speaker detected in the targeted speech period is higher than the selection threshold value, the state redetermining unit 14 determines the state of the speaker to be probable.

The selection threshold value has a value equal to or higher than the redetermination threshold value, and for example, is determined as described below. First, the processing unit 6 adds an increment value obtained by dividing a difference between the maximum value and the minimum value of degrees of accuracy that can be outputted by the primary state detecting unit 13 by, for example, 100, to the minimum value, so as to make the provisional threshold value. Herein a value for obtaining the increment value, by which the difference between the maximum value and the minimum value of the degrees of accuracy, may be 1,000 or 10,000 depending upon the number of effective digits of the degree of accuracy. The processing unit 6 obtains an error rate of a detection result of a state of a speaker outputted by the primary state detecting unit 13 for a speech period having a higher degree of accuracy than the provisional threshold value with respect to the plurality of voice data samples for which a state of a speaker has been known in advance. The processing unit 6 sequentially adds the increment value to the provisional threshold value to change the provisional threshold value and at the same time obtain the error rate for each provisional threshold value, and uses a provisional threshold value at the time of the error rate being the minimum as the selection threshold value. Other devices different from the speaker state detecting apparatus may determine the selection threshold value in advance in compliance with the above-described procedure.

The learning unit 16 updates a state affection model using the sample for learning purposes each time the number of samples for learning purposes which have been additionally stored in the storage unit 4 is increased by a predetermined number. The predetermined number is set, for example, to any value between 100 and 10,000.

The learning unit 16 uses only the samples for learning purposes additionally stored at or after the time of updating of the previous state affection model to compute a conditional probability of each of the possible state the affected person can have, for each set of a state of the affecting person and a pattern of an overlap period or speech interval in a speech period of the affecting person. On this occasion, the learning unit 16 computes a conditional probability in compliance with much the same manner as a method of preparing a state affection model described concerning the state redetermining unit in the first embodiment. Then, the learning unit 16 obtains an average value of a newly-computed conditional probability and a conditional provability included in a state affection model for each conditional probability for a state of the affected person having the same condition, and uses the average value to update a value of the conditional probability included in the state affection model.

Alternatively, samples for learning purposes having been used when the state affection model are prepared at first may be prospectively stored in the storage unit 4. The learning unit 16 uses the prospectively-stored samples for learning purposes and additionally-stored samples for learning purposes to compute a conditional probability of each of the possible states the affected person can have, for each set of a state of the affecting person and a pattern of an overlap period or speech interval in a speech period of the affecting person. Then, the learning unit 16 may update a value of the conditional probability included in a state affection model with the computed conditional probability.

The speaker state detecting apparatus according to the third embodiment, when the detection result of a state of a speaker is probable, uses information about a speech period corresponding to that state and any speech period prior thereto as a sample for learning purposes to update a state affection model. Thereby, this speaker state detecting apparatus can optimize a state affection model according to a specified speaker using the speaker state detecting apparatus. Therefore, this speaker state detecting apparatus can more improve a detection accuracy of a state of the speaker.

According to a modification, the processing unit applied to the second embodiment may have a function of the learning unit of the processing unit applied to the third embodiment. Also in this case, when the detected state of a speaker is probable, a state redeterminating unit of the processing unit regards the corresponding speech period as a speech period of the affected person, and a plurality of speech periods immediately prior thereto as speech periods of the affecting person. Then, the state redetermining unit additionally stores a set of a state of a speaker in each speech period and a pattern of the overlap period and speech interval as a sample for learning purposes in the storage unit 4. The learning unit may perform much the same process as the learning unit according to the third embodiment, so as to update the state affection model.

The following is description of a speaker state detecting apparatus according to a fourth embodiment. The speaker state detecting apparatus according to the fourth embodiment uses a pattern of the overlap period or speech interval between the speech periods as one feature amount for detecting a state of a speaker in a speech period, so as to detect a state of at least one speaker.

A speaker state detecting apparatus according to the fourth embodiment differs in respect of only a part of a function executed by the processing unit from the speaker state detecting apparatus according to the first embodiment. So, hereinafter, the processing unit will be described.

Figure 12:
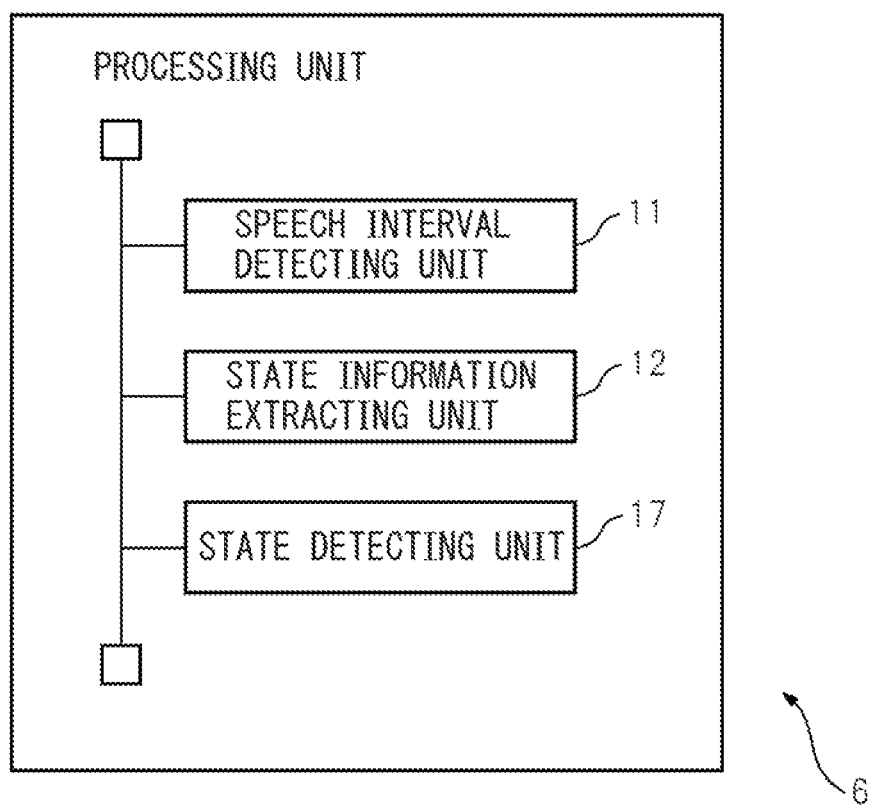
FIG. 12 is a functional block diagram of a processing unit of a speaker state detecting apparatus according to a fourth embodiment.

FIG. 12 is a functional block diagram of the processing unit of the speaker state detecting apparatus according to the fourth embodiment. The processing unit 6 includes a speech interval detecting unit 11, a state information extracting unit 12 and a state detecting unit 17. Among them, the speech interval detecting unit 11 and the state information extracting unit 12 has much the same process as a pattern of the corresponding constituent elements of the processing unit 6 according to the first embodiment. For this reason, the following description is given concerning the state detecting unit 17.

The state detecting unit 17 uses a discriminator that receives input parameters including: a set of state information extracted by the state information extracting unit 12; and a pattern of an overlap period or speech interval between speech periods detected by the speech interval detecting unit 11, and outputs a state of a speaker. Then, the state detecting unit 17 may obtain a state of a speaker in the targeted speech period by inputting a set of the state information extracted for the targeted speech period and a pattern of an overlap period or speech interval of the targeted speech period and a speech period immediately prior thereto to the discriminator. The input parameters may further include a state of a speaker that is the affecting person in the speech period of the affecting person.

Such a discriminator is, for example, stored in the storage unit 4 in advance. For instance, as the discriminator, a probability model for outputting a conditional probability of a state of the speaker in response to the input parameters for each of the possible states the speaker can have. The probability model can, for example, be a Bayesian network. In this case, the state detecting unit 17 derives a conditional probability of each of the possible states the speaker can have by inputting a set of state information extracted for the targeted speech period and a pattern of an overlap period or speech interval of the targeted speech period and a speech period immediately prior thereto to the probability model. Then, the state detecting unit 17 detects a state whose resultant conditional probability is the highest as a state of the speaker. In this situation, the probability model is prepared in advance, for example according to much the same learning manner as a learning method of a probability model available in the primary state detecting unit applied to the first embodiment.

The state detecting unit 17 may use other discriminator created by machine learning, e.g., multilayer perceptron as the discriminator. In this example, the multilayer perceptron is subjected to learning in, for example, a back propagation method, using a set of input parameters obtained from multiple sorts of voice data whose state of a speaker for each speech period has been known in advance and a state of a speaker as a sample for learning purposes.

In this embodiment, since the state detecting unit 17 do not perform the redetermination of a state of a speaker based on a degree of accuracy, a degree of accuracy of the detected state is not necessary to derive.

The speaker state detecting apparatus according to the fourth embodiment can obtain a state of a speaker at one time using a pattern of an overlap period or speech interval between speech periods together with other state information, and redetermination of a state of a speaker does not have to be carried out. For this reason, this speaker state detecting apparatus can shorten a calculation time required to detect a state of a speaker.

Furthermore, a computer program for causing a computer to implement functions owned by the processing unit of the speaker state detecting apparatus according to each of the above-described embodiments may be provided in such a form that the program is recorded on a medium readable by the computer, such as a magnetic recording medium or optical recording medium.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A speaker state detecting apparatus comprising:
    an audio input unit which acquires, at least, a first voice emanated by a first speaker and a second voice emanated by a second speaker;
    a storage unit which stores a state affection model with respect to a set of an overlap period or interval between two speech periods that are temporally continuous and a state of a speaker who has emanated a voice in a preceding speech period of the two speech periods, the model including probabilities of respective possible states which a speaker who has emanated a voice in a later speech period of the two speech periods can have; and
    a processor adapted to detect an overlap period between a first speech period of the first speaker included in the first voice and a second speech period of the second speaker included in the second voice, which starts before the first speech period, or an interval between the first speech period and the second speech period;
    extract first state information representing a state of the first speaker from the first speech period and second state information representing a state of the second speaker from the second speech period; and
    detect the state of the first speaker in the first speech period based on the overlap period or the interval and the first and second state information,
    the detecting the state of the first speaker comprising:
        detecting a state of the second speaker in the second speech period based on the second state information;
        detecting a state of the first speaker in the first speech period based on the first state information;
        deriving a degree of accuracy representing a likelihood of the state of the first speaker; and
        determining the detected state of the first speaker to be a state of the first speaker in the first speech period when the degree of accuracy is higher than a redetermination threshold value, and when the degree of accuracy is equal to or lower than the redetermination threshold value, obtaining probabilities of the possible states which the first speaker can have, corresponding to a set of the overlap period or the interval and the state of the second speaker in the second speech period in accordance with the state affection model and determining a state for which the probability is the maximum, of the possible states which the first speaker can have, to be the state of the first speaker in the first speech period.

2. The speaker state detecting apparatus according to claim 1, wherein, when the degree of accuracy is greater than a selection threshold value having a value equal to or higher than the redetermination threshold value, the detecting the state of the first speaker stores a set of: the state of the first speaker in the first speech period corresponding to that degree of accuracy; the state of the second speaker in the second speech period; and the overlap period or the interval, as a sample for learning purposes, in the storage unit, and the processor further adapted to:
    update the state affection model using the sample for learning purposes.

3. A speaker state detecting apparatus according to claim 2, wherein, when the number of the samples for learning purposes which are stored in the storage unit reaches a predetermined number, the updating the state affection model divides a frequency for each of the possible states of the first speaker with respect to the set of the state of the second speaker and the overlap period or the interval in the predetermined number of samples for learning purposes by a sum of the frequencies to derive an update value of the probability for each of the possible states, and updates the probability for each possible state of the speaker emanating a voice in the later speech period, included in the state affection model, with the update value of the probability corresponding to that state.

4. The speaker state detecting apparatus according to claim 1, wherein the state affection model includes, with respect to a set of: an overlap period or interval every two speech periods that are temporally continuous, of n speech periods included in at least two or more voices; and a state of a speaker emanating a voice in each speech period other than the last speech period of the n speech periods, probabilities of the possible states of the speaker emanating a voice in the last speech period, where n is an integer equal to or greater than three, wherein the extracting the second state information extracts second state information representing a state of a speaker corresponding to each of temporally continuous (n−1) speech periods including the second speech period in at least the first voice and the second voice, and the detecting the state of the second speaker detects states of the speakers corresponding to the (n−1) speech periods, respectively, based on the second state information; and determining the state of the first speaker when the degree of accuracy is equal to or lower than the redetermination threshold value, derives respective probabilities of the possible states which the first speaker can have, corresponding to a set of: an overlap period or interval every two speech periods that are temporally continuous, of the temporally continuous n speech periods including the first and second speech periods in at least the first voice and the second voice; and a state of a speaker in each of speech periods other than the first speech period, of the n speech periods, in accordance with the state affection model determines a state for which the probability is the maximum, of the possible states of the first speaker to be a state of the first speaker in the first speech period.

5. The speaker state detecting apparatus according to claim 1, wherein the detecting the state of the first speaker in the first speech period based on the first state information inputs the overlap period or the interval and the first state information to a discriminator for defining a state of the first speaker in the first speech period with respect to each of a plurality of possible combinations of the overlap period or the interval and the first state information, thereby to detect the state of the first speaker in the first speech period.

6. The speaker state detecting apparatus according to claim 1, wherein the audio input unit comprises a microphone for collecting the first voice and a communicating unit adapted to receive the second voice through a communication line.

7. A speaker state detecting method comprising:
acquiring, at least, a first voice emanated by a first speaker and a second voice emanated by a second speaker by an audio input unit;

detecting an overlap period between a first speech period of the first speaker included in the first voice and a second speech period of the second speaker included in the second voice, which starts before the first speech period, or an interval between the first speech period and the second speech period by a processor;

extracting first state information representing a state of the first speaker from the first speech period and second state information representing a state of the second speaker from the second speech period by the processor; and detecting the state of the first speaker in the first speech period based on the overlap period or the interval and the first and second state information by the processor, the detecting the state of the first speaker comprising:
detecting a state of the second speaker in the second speech period based on the second state information;
detecting a state of the first speaker in the first speech period based on the first state information;
deriving a degree of accuracy representing a likelihood of the state of the first speaker; and
determining the detected state of the first speaker to be a state of the first speaker in the first speech period when the degree of accuracy is higher than a redetermination threshold value, on the other hand, when the degree of accuracy is equal to or lower than the redetermination threshold value, obtaining probabilities of possible states which the first speaker can have, corresponding to a set of the overlap period or the interval and the state of the second speaker in the second speech period in accordance with a state affection model, which includes, with respect to a set of an overlap period or interval between two speech periods that are temporally continuous and a state of a speaker who has emanated a voice in a preceding speech period of the two speech periods, probabilities of respective possible states which a speaker who has emanated a voice in a later speech period of the two speech periods can have, and determining a state for which the probability is the maximum, of the possible states which the first speaker can have, to be the state of the first speaker in the first speech period.

8. A non-transitory computer-readable recording medium in which a computer program for detecting a state of a speaker, the program causing a computer to execute operations, the operations comprising:
acquiring, at least, a first voice emanated by a first speaker and a second voice emanated by a second speaker;
detecting an overlap period between a first speech period of the first speaker included in the first voice and a second speech period of the second speaker included in the second voice, which starts before the first speech period, or an interval between the first speech period and the second speech period;
extracting first state information representing a state of the first speaker from the first speech period and second state information representing a state of the second speaker from the second speech period; and
detecting the state of the first speaker in the first speech period based on the overlap period or the interval and the first and second state information,
the detecting the state of the first speaker comprising:
detecting a state of the second speaker in the second speech period based on the second state information;
detecting a state of the first speaker in the first speech period based on the first state information;
deriving a degree of accuracy representing a likelihood of the state of the first speaker; and
determining the detected state of the first speaker to be a state of the first speaker in the first speech period when the degree of accuracy is higher than a redetermination threshold value, and when the degree of accuracy is equal to or lower than the redetermination threshold value, obtaining probabilities of possible states which the first speaker can have, corresponding to a set of the overlap period or the interval and the state of the second speaker in the second speech period in accordance with a state affection model, which includes, with respect to a set of an overlap period or interval between two speech periods that are temporally continuous and a state of a speaker who has emanated a voice in a preceding speech period of the two speech periods, probabilities of respective possible states which a speaker who has emanated a voice in a later speech period of the two speech periods can have, and determining a state for which the probability is the maximum, of the possible states which the first speaker can have, to be the state of the first speaker in the first speech period.

* * * * *